US012615540B2

(12) United States Patent
Zhao et al.

(10) Patent No.: US 12,615,540 B2
(45) Date of Patent: Apr. 28, 2026

(54) ELECTRONIC DEVICE, METHOD AND STORAGE MEDIUM FOR WIRELESS COMMUNICATION SYSTEM

(71) Applicant: Sony Group Corporation, Tokyo (JP)

(72) Inventors: Youping Zhao, Beijing (CN); Jiaqi Guo, Beijing (CN); Zhong Tian, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 298 days.

(21) Appl. No.: 18/283,476

(22) PCT Filed: Mar. 25, 2022

(86) PCT No.: PCT/CN2022/082903
§ 371 (c)(1),
(2) Date: Sep. 22, 2023

(87) PCT Pub. No.: WO2022/206572
PCT Pub. Date: Oct. 6, 2022

(65) Prior Publication Data
US 2024/0172031 A1 May 23, 2024

(30) Foreign Application Priority Data

Mar. 31, 2021 (CN) .......................... 202110344226.3

(51) Int. Cl.
*H04W 28/02* (2009.01)
*H04W 72/044* (2023.01)
*H04W 72/27* (2023.01)
(52) U.S. Cl.
CPC ... *H04W 28/0236* (2013.01); *H04W 28/0252* (2013.01); *H04W 72/046* (2013.01); *H04W 72/27* (2023.01)

(58) Field of Classification Search
CPC ......... H04W 28/0236; H04W 28/0252; H04W 72/046; H04W 72/27; H04W 52/283;
(Continued)

(56) References Cited

U.S. PATENT DOCUMENTS

| 2019/0132805 A1 | 5/2019 | Abedini et al. |
| 2020/0100298 A1 | 3/2020 | Pan et al. |

(Continued)

FOREIGN PATENT DOCUMENTS

| CN | 111526543 A | 8/2020 |
| WO | 2017/034728 A1 | 3/2017 |

(Continued)

OTHER PUBLICATIONS

International Search Report and Written Opinion mailed on May 19, 2022, received for PCT Application PCT/CN2022/082903, filed on Mar. 25, 2022, 8 pages including English Translation.

*Primary Examiner* — Mohamed A Kamara
(74) *Attorney, Agent, or Firm* — XSENSUS LLP

(57) ABSTRACT

The present disclosure relates to electronic devices, methods and storage medium for a wireless communication system. Various embodiments regarding interference suppression and access control are described. In an embodiment, an electronic device for an integrated access and backhaul (TAB) communication system includes a processing circuit configured to obtain basic information of a first IAB node and a second IAB node, the basic information includes a location and radio receive (RX)/transmit (TX) status of a corresponding IAB node, and the radio RX/TX status includes one or more of antenna array configuration, beam configuration, transmit power, and current reception performance of the corresponding IAB node. The processing circuit is further configured to send control information to the second IAB node.

19 Claims, 18 Drawing Sheets

(58) Field of Classification Search
CPC . H04W 52/367; H04W 88/06; H04W 88/085;
H04W 88/14; H04W 52/24; H04W 52/38;
H04W 52/243; H04W 72/0473; H04B
7/0617; H04B 7/0686; H04B 7/0695;
H04B 7/14; H04B 7/15; H04B 7/26;
H04B 17/30; H04B 17/318; H04B
17/345; H04L 43/00
See application file for complete search history.

(56)                      References Cited

U.S. PATENT DOCUMENTS

| | | | |
|---|---|---|---|
| 2020/0107362 A1 | 4/2020 | Qi et al. | |
| 2021/0160703 A1* | 5/2021 | Luo ...................... | H04W 48/10 |
| 2022/0132432 A1* | 4/2022 | Kim .................... | H04W 52/146 |
| 2023/0080162 A1* | 3/2023 | Ghanbarinejad ..... | H04W 52/46 |
| | | | 455/522 |
| 2024/0163808 A1* | 5/2024 | Agarwal .............. | H04B 17/327 |

FOREIGN PATENT DOCUMENTS

| | | |
|---|---|---|
| WO | 2020/027978 A1 | 2/2020 |
| WO | 2020/033655 A1 | 2/2020 |
| WO | 2020/092403 A1 | 5/2020 |
| WO | 2020/146631 A1 | 7/2020 |
| WO | 2021/020350 A1 | 2/2021 |

* cited by examiner

200

First Control Unit   202

First Transceiver Unit   204

250

Second Control Unit   252

Second Transceiver Unit
254

300

Determine a reception performance threshold for a first IAB node  302

Determine a maximum receive interference power value bearable by the first IAB node  304

Determine a maximum transmit interference power value at a specific point in a three-dimensional space 306

Determine a boundary of a first power-limited area  308

1000

A first condition is satisfied? 1002 —Yes→ Determine to access an IAB donor 1004

No

A second condition is satisfied? 1012 —Yes→ Determine to access a static IAB node 1014

No

A third condition is satisfied? 1022 —Yes→ Determine to access a dynamic IAB node 1024

No

Adjust an IAB node 1026

1100

Determine an IAB node to be adjusted  1102

Adjust the determined IAB node  1104

Notify user equipments to access the adjusted IAB node 1106

1200

1250

| System parameter | Parameter value (value range) |
| --- | --- |
| Center operating frequency | 75 GHz |
| Simulation area | 500m×500m×500m |
| Channel width | 500 MHz |
| Transmit power of IAB donor | 30dBm |
| SINR threshold of IAB donor | 30 dB |
| Transmit power of IAB node | 20dBm |
| Minimum distance between IAB nodes | 50m |
| Height of IAB donor | 50m |
| Path loss coefficient | 2 |
| Antenna array element of IAB donor | Patch |
| Type of antenna array of IAB donor | 64ULA |
| Antenna array element of IAB node | Patch |
| Type of antenna array of IAB node | 2ULA |
| Speed of dynamic IAB node | 1m/s |

FIG. 16B

ELECTRONIC DEVICE, METHOD AND STORAGE MEDIUM FOR WIRELESS COMMUNICATION SYSTEM

CROSS-REFERENCE TO RELATED APPLICATIONS

The present application is based on PCT filing PCT/CN2022/082903, filed Mar. 25, 2022, which claims priority from Chinese Patent Application No. 202110344226.3, filed Mar. 31, 2021, the entire contents of each are incorporated herein by reference.

TECHNICAL FIELD

The present disclosure generally relates to wireless communication devices and methods, and particularly to techniques for improving performance of an integrated access and backhaul (IAB) communication system.

BACKGROUND

The integrated access and backhaul (IAB) technology is considered to be an important technology for flexible and cost-effective 5G (such as New Radio (NR) system) deployment, and can provide an advantageous 5G deployment solution. In an IAB communication system, an existing 5G radio framework can be used for access links and backhaul links, allowing operators to expand coverage by installing network devices more densely without having to lay wired lines such as optical fibers. In this way, the IAB technology can reduce costs of deploying dense networks and improve coverage performance of cellular networks. The IAB technology for millimeter wave (mmWave) frequency band is introduced to Release 16 of the 3rd Generation Partnership Project (3GPP) standard as one of solutions that can meet requirements of 5G backhaul.

In the IAB communication system, an IAB donor and an IAB node may be fixedly deployed or may be mobile. For example, an unmanned aerial vehicle or other flying devices may be used to implement at least one of the IAB donor and the IAB node. In fixed or flexible deployment, it is necessary to consider a coexistence scheme for the IAB donor and the IAB nodes with overlapping operating frequency bands, so as to suppress interference therebetween and improve access performance of the communication system.

SUMMARY

A first aspect of the present disclosure relates to an electronic device for an IAB communication system. The IAB communication system includes an IAB donor and at least a first IAB node and a second IAB node, operating frequency bands of the IAB donor and the IAB nodes at least partially overlap, and the electronic device includes a processing circuit. The processing circuit is configured to: obtain basic information of the first IAB node and the second IAB node, where the basic information includes a location and radio receive (RX)/transmit (TX) status of a corresponding IAB node, and the radio RX/TX status includes one or more of antenna array configuration, beam configuration, transmit power, and current reception performance of the corresponding IAB node. The processing circuit is further configured to: send control information to the second IAB node, where the control information includes at least one of the following: path information, for instructing the second IAB node to avoid approaching the first IAB node; or adjustment information for the radio RX/TX status, for instructing of adjusting beam direction of the second IAB node or reducing transmit power of the second IAB node.

A second aspect of the present disclosure relates to an electronic device for a second IAB node in an IAB communication system. The IAB communication system includes an IAB donor and at least a first IAB node and the second IAB node, operating frequency bands of the IAB donor and the IAB nodes at least partially overlap, and the electronic device includes a processing circuit. The processing circuit is configured to: send basic information of the second IAB node to a spectrum management device, where the basic information includes a location and radio RX/TX status of the second IAB node, and the radio RX/TX status includes one or more of antenna array configuration, beam configuration, transmit power, and current reception performance of the second IAB node. The processing circuit is further configured to: receive control information from the spectrum management device, where the control information includes at least one of the following: path information, for instructing the second IAB node to avoid approaching the first IAB node; or adjustment information for the radio RX/TX status, for instructing of adjusting beam direction of the second IAB node or reducing transmit power of the second IAB node.

A third aspect of the present disclosure relates to a method for an IAB communication system. The method includes: obtaining basic information of a first IAB node and a second IAB node, where the basic information includes a location and radio RX/TX status of a corresponding IAB node, and the radio RX/TX status includes one or more of antenna array configuration, beam configuration, transmit power, and current reception performance of the corresponding IAB node; and sending control information to the second IAB node, where the control information includes at least one of the following: path information, for instructing the second IAB node to avoid approaching the first IAB node; or adjustment information for the radio RX/TX status, for instructing of adjusting beam direction of the second IAB node or reducing transmit power of the second IAB node.

A fourth aspect of the present disclosure relates to a method for a second IAB node in an IAB communication system. The method includes: sending basic information of the second IAB node to a spectrum management device, where the basic information includes a location and radio RX/TX status of the second IAB node, and the radio RX/TX status includes one or more of antenna array configuration, beam configuration, transmit power, and current reception performance of the second IAB node; and receiving control information from the spectrum management device, where the control information includes at least one of the following: path information, for instructing the second IAB node to avoid approaching a first IAB node; or adjustment information for the radio RX/TX status, for instructing of adjusting beam direction of the second IAB node or reducing transmit power of the second IAB node.

A fifth aspect of the present disclosure relates to a computer-readable storage medium storing thereon executable instructions. The executable instructions, when executed by one or more processors, implement operations of the method according to various embodiments in the present disclosure.

A sixth aspect of the present disclosure relates to a computer program product. The computer program product comprises instructions which, when executed by a computer, cause the computer to perform the method according to various embodiments in the present disclosure.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings

BRIEF DESCRIPTION OF DRAWINGS

A better understanding of the present disclosure can be achieved by referring to the detailed description given hereinafter in connection with the accompanying drawings. The same or similar reference numerals are used in the accompanying drawings to denote the same or similar components. The accompanying drawings together with the following detailed description are included in the specification and form a part of the specification, and are used to exemplify the embodiments of the present disclosure and explain the principles and advantages of the present disclosure, where:

FIGS. 16A to 18 illustrate example simulation settings and simulation performance related to the solution according to the present disclosure.

Although the embodiments described in the present disclosure may have various modifications and alternatives, specific embodiments thereof are illustrated as examples in the accompany drawings and described in detail in this specification. It should be understood that the drawings and detailed description thereof are not intended to limit embodiments to the specific forms disclosed, but to cover all modifications, equivalents, and alternatives falling within the spirit and scope of the claims.

DETAILED DESCRIPTION OF EMBODIMENTS

The following describes representative applications of various aspects of the device and method according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Example of an IAB Communication System

Figure 1:
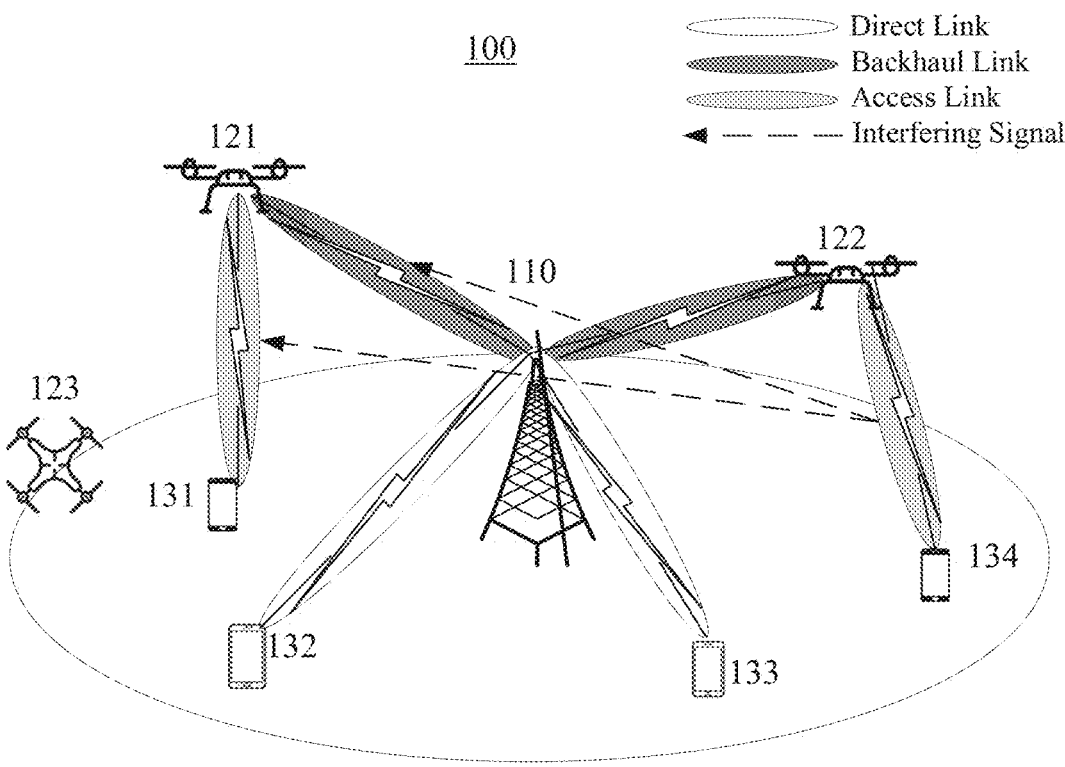
FIG. 1 illustrates an example scenario diagram of an IAB communication system according to an embodiment of the present disclosure.

FIG. 1 illustrates an example scenario diagram of an IAB communication system according to an embodiment of the present disclosure. As shown in FIG. 1, the IAB communication system 100 includes an IAB donor 110, IAB nodes 121 to 123, and terminal devices 131 to 134. With the integrated wireless access function and wireless backhaul function, the IAB donor 110 provides coverage and access services for multiple IAB nodes and terminal devices. Specifically, on the one hand, the IAB donor 110 may be connected to a core network (not shown) via a wired cable (for example, optical fiber or cable); on the other hand, the IAB donor 110 may provide a wireless backhaul link to an IAB node (for example, 121 or 122) and provide a wireless access link to a terminal device (for example, 132 or 133). Taking the IAB node 121 as an example, on the one hand, it may be connected to a core network through a wireless backhaul link provided by the IAB donor 110, and may provide a wireless access link to the terminal device 131 on the other hand, to provide an access service for the terminal device 131.

In the IAB communication system 100, the IAB node 121 is connected to the core network through the wireless backhaul link provided by the IAB donor 110, not requiring wired connection to the core network. This reduces deployment costs, provides deployment flexibility, and facilitates dense deployment of IAB nodes as compared to deployment of wired connections.

In the present disclosure, the IAB donor and the IAB nodes may be collectively referred to as IAB base stations, which form an access network according to a certain network topology relationship. The IAB base station may be a 5G NR base station, such as gNB and ng-eNB. The gNB may provide NR user plane and control plane protocols for terminating with the terminal device the ng-eNB is a node defined for compatibility with the 4G LTE communication system, which may be an upgrade of an evolved NodeB (eNB) of an LTE radio access network, providing an evolved universal terrestrial radio access (E-UTRA) user plane and control plane protocols for terminating with UEs. Certainly, the IAB base station may alternatively cover a variety of control devices on the network side, such as an eNB in an LTE communication system, a remote radio head end, a radio access point, an unmanned aerial vehicle or an aircraft having a control function, a control node in an automation plant, or a communication device performing a similar function. Examples of the IAB base station may include but are not limited to the following: at least one of a base transceiver station (BTS) and a base station controller (BSC) in a GSM system; at least one of a radio network controller (RNC) and a Node B in a WCDMA system; access points (APs) in WLAN and WiMAX systems; and corresponding network nodes in communication systems to be developed or under development. Part of functions of a base station herein can also be implemented as an entity having a control function on communication in the D2D, M2M, and V2V communication scenarios, or as an entity that plays a role of spectrum coordination in a cognitive radio communication scenario.

In the present disclosure, the terminal device may have the full breadth of its ordinary meaning, for example, the terminal device may be a mobile station (MS), user equipment (User Equipment, UE), and the like. The terminal device may be implemented as a device such as a mobile phone, a handheld device, a media player, a computer, a laptop or a tablet, or a wireless device of almost any type. In some cases, the terminal device may communicate using multiple wireless communication technologies. For example, the terminal device may be configured to communicate using one or more of GSM, UMTS, CDMA2000, WiMAX, LTE, LTE-A, WLAN, NR, Bluetooth, and so on. For ease of description, the following describes embodiments with more reference to user equipment, although these embodiments are applicable to any terminal devices.

It should be understood that FIG. 1 illustrates only one of multiple types and possible arrangements of IAB communication systems. The embodiments of the present disclosure may be implemented in a system with modifications or variations as needed. For example, in the TAB communication system 100, only the IAB donor 110 is configured to provide a wireless backhaul link to the IAB nodes, forming a single-hop IAB structure. However, in a variation system, an IAB node may further provide wireless backhaul links to other IAB nodes, forming a multi-hop IAB structure.

In the present disclosure, the IAB nodes may include controlled IAB nodes and uncontrolled IAB nodes. For example, a controlled IAB node may be deployed by an operator. Such type of IAB node is planned and controlled by the operator and have characteristics already known to the operator. An uncontrolled IAB node may not be planned and controlled and have characteristics unknown to the operator. The uncontrolled IAB node may be owned by an operator or any other entities. Generally, a backhaul link of the controlled IAB node is more stable and reliable than that of the uncontrolled IAB node. Correspondingly, providing access services by the controlled IAB node is more advantageous for the user equipment. For the system, in a case that the controlled IAB node is not available (for example, due to high load or insufficient deployment of nodes), an uncontrolled IAB node may be used to provide access for user equipment, acting as a complement to the controlled IAB node. According to an embodiment, an example of the controlled IAB node may include a macro IAB (macro IAB) node, and an example of the uncontrolled IAB node may include a Pico IAB node.

In the present disclosure, based on whether mobility is supported, the IAB nodes may include dynamic and static IAB nodes. Due to factors such as non-line of sight (NLOS), coverage holes are inevitably present in the IAB communication system. In an embodiment, with mobility of the dynamic IAB node, location of the dynamic IAB node may be adjusted based on coverage requirements to provide access services to the user equipments in a more targeted manner. Although location of the static IAB node is relatively fixed, in an embodiment, a radio RX/TX status of the static IAB node may be adjusted to meet coverage and quality of service requirements. In the present disclosure, there may be controlled or uncontrolled dynamic IAB nodes, as well as controlled or uncontrolled static IAB nodes.

As shown in FIG. 1, an IAB node may be implemented by an unmanned aerial vehicle (UM), an in-vehicle radio device, or the like. They may carry omnidirectional or directional antennas that support the massive MIMO technology. In the present disclosure, the IAB donor may be implemented by a macro station supporting massive MIMO or a hovering UAV, so as to support rapid network deployment.

The IAB donor and the IAB nodes may use various forms of antenna arrays, such as uniform linear array, uniform planar array, or cylindrical array. The antenna array may support different configurations. The antenna array configuration may be described using a radio RX/TX status, which is to be described in more details below.

In the present disclosure, the IAB donor and the multiple IAB nodes may operate in various frequency bands, such as millimeter wave frequency band, and their operating frequency bands may at least partially overlap. While coverage is increased by the TAB structure, it is necessary to control multiple IAB base stations whose operating bands overlap to suppress interference between the IAB base stations. This helps improve the spectrum utilization efficiency and system capacity of the system. In addition, it is necessary to control access of user equipments, so as to improve the number of accessed users and the access stability. The device performing the control function for the IAB communication system may include a spectrum management device (not shown in FIG. 1), such as a coexistence manager. In an embodiment, the spectrum management device may be implemented as part of the IAB donor or provided distinctly from the IAB donor.

Examples of the Electronic Device

Figure 2A:
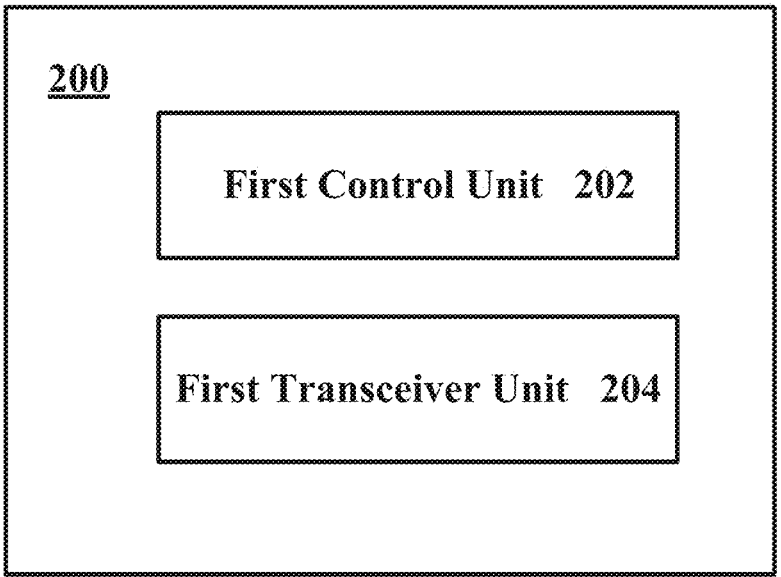
FIG. 2A illustrates an example of an electronic device used for an IAB communication system according to an embodiment of the present disclosure.

FIG. 2A illustrates an example of an electronic device used for an IAB communication system according to an embodiment of the present disclosure. The electronic device 200 shown in FIG. 2A may include a variety of units to implement embodiments for interference suppression and/or access control according to the present disclosure. In this example, the electronic device 200 includes a first control unit 202 and a first transceiver unit 204. The various operations described below with reference to the spectrum management device may be implemented by units 202 to 204 or other possible units of the electronic device 200.

In an embodiment, the first control unit 202 may be configured to obtain basic information of IAB nodes (such as the IAB nodes 121 and 122). The basic information may include a location and radio RX/TX status of a corresponding IAB node. The location information may indicate a single location of the IAB node in a three-dimensional space; or the location information may indicate multiple locations of the IAB node in the three-dimensional space at specific times, for example, the location information may be in a form of motion path or track. The radio RX TX status may include one or more of antenna array configuration, beam configuration, transmit power, and current reception performance of a corresponding IAB node.

In an embodiment, the first transceiver unit 204 may be configured to transmit control information to the second IAB node. The control information may include at least one of path (or track) information and adjustment information for the radio RX/TX status. The path information may instruct the second IAB node to avoid approaching the first IAB node. The adjustment information for the radio RX/TX status may instruct adjusting a beam direction of the second IAB node or adjusting (for example, decreasing or increasing) transmit power of the second IAB node. Adjusting the path or the radio RX/TX status of the second IAB node can suppress interference of the second IAB node to the first IAB node, as described in detail below.

In an embodiment, the first transceiver unit 204 may be further configured to send signals to or receive signals from the IAB donor and/or the IAB nodes.

Figure 2B:
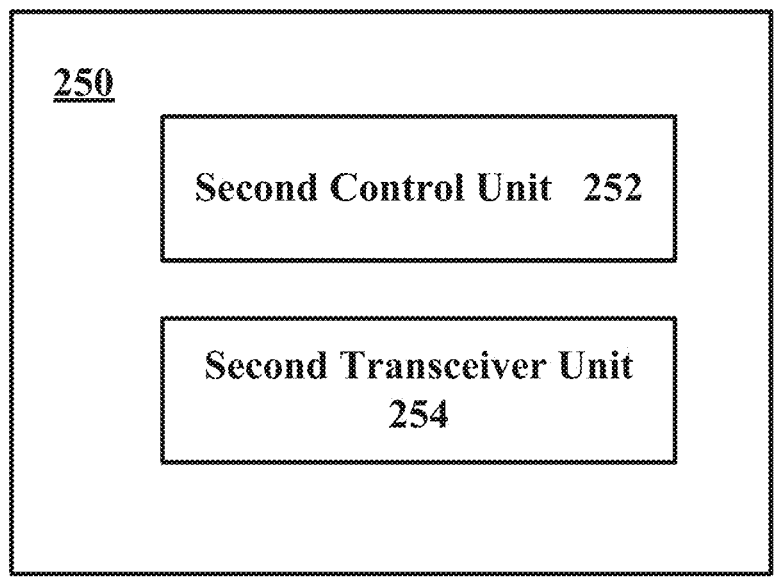
FIG. 2B illustrates another example of an electronic device used for an IAB communication system according to an embodiment of the present disclosure.

FIG. 2B illustrates another example of an electronic device used for an IAB communication system according to an embodiment of the present disclosure. The electronic device 250 shown in FIG. 2B may include a variety of units to implement embodiments for interference suppression and/or access control according to the present disclosure. In this example, the electronic device 250 includes a second control unit 252 and a second transceiver unit 254. The various operations described below with reference to an IAB node may be implemented by units 252 to 254 or other possible units of the electronic device 250.

In an embodiment, the second control unit 252 may be configured to send basic information of an IAB node (for example, the second IAB node) to the spectrum management device. The basic information may include a location and radio RX/TX status of the second IAB node. Also, the location information may indicate a single location of the second IAB node in a three-dimensional space; or the location information may indicate multiple locations of the second IAB node in the three-dimensional space at specific times, for example, the location information may be in a form of motion path or track. The radio RX/TX status may include one or more of antenna array configuration, beam configuration, transmit power, and current reception performance of the second IAB node.

In an embodiment, the second transceiver unit 254 may be configured to receive control information from the spectrum management device. Also, the control information may include at least one of path information and adjustment information for the radio RX/TX status. The path information may instruct the second IAB node to avoid approaching the first IAB node. The adjustment information for the radio RX/TX status may instruct adjusting beam direction of the second IAB node or adjusting (for example, reducing or increasing) transmit power of the second IAB node. Adjusting the path or the radio RX/TX status of the second IAB node can suppress interference of the second IAB node to the first IAB node, as described in detail below.

In an embodiment, the second transceiver unit 254 may be further configured to send signals to or receive signals from the spectrum management device, the IAB donor, and/or other IAB nodes.

In some embodiments, the electronic devices 200 and 250 may be implemented at the chip level, or may be implemented at the device level by including other external components (such as radio links and antennas). For example, the electronic devices 200 and 250 may each operate as a communication device by working as a whole machine.

It should be understood that the above various units are only logical modules divided based on logical functions to be implemented by the units, and are not intended to limit specific implementations, for example, the units may be implemented by software, hardware, or a combination of software and hardware. In actual implementation, the above various units may be implemented as independent physical entities, or may be implemented by a single entity (for example, a processor (CPU, DSP, or the like), or an integrated circuit). The processing circuitry may refer to various implementations of a digital circuitry, an analog circuitry, or a mixed signal (combination of analog and digital) circuitry that perform functions in a computing system. The processing circuitry can include, for example, a circuit such as an integrated circuit (IC), an application specific integrated circuit (ASIC), a portion or circuit of a separate processor core, the entire processor core, a separate processor, a programmable hardware device such as a field programmable gate array (FPGA), and/or a system including multiple processors.

In the IAB communication system of the present disclosure, the IAB nodes may be controlled or coordinated based on the basic information of the IAB nodes to reduce harmful interference between the IAB nodes. For example, the main control operation may be performed by the spectrum management device. In an embodiment, based on the location of a corresponding IAB node, the motion path of the IAB node may be planned to avoid the IAB nodes approaching each other, for example, such that a distance between two or more IAB nodes is greater than a specific threshold during at least most of the time. The specific threshold may be set based on a test or empirical value. Alternatively or additionally, a radio RX/TX status of another IAB node may be adjusted based on whether reception performance of a specific IAB node meets an expected level. For example, at least one of antenna array configuration, beam direction or gain level, transmit power, and the like of the IAB node may be adjusted to reduce harmful interference to a reception operation of the specific IAB node.

In an embodiment, the motion path may represent specific locations of an IAB node in the three-dimensional space at specific times. The path information may be in multiple forms, such as a continuous road map in the three-dimensional space or discrete position information corresponding to specific time points. In an embodiment, a location of the IAB node at a specific time point in the future may be predicted based on current velocity vector information of the IAB node. Therefore, it may be considered that the speed vector information may also indicate the path information of the IAB node. In an embodiment, the spectrum management device may plan the motion path of the IAB node through a higher layer. For example, a classic UAV path planning algorithm (for example, ant colony algorithm, genetic algorithm, or particle swarm optimization algorithm) may be used for the planning.

In some embodiments, an appropriate distance between the IAB nodes may be determined based on test or empirical values to avoid harmful interference between the TAB nodes. In some other embodiments, the IAB nodes may be prevented from approaching each other based on a power-limited area, as described in more detail below.

Power-Limited Area

In this specification, the power-limited area is generally expressed as "power-limited area of X for Y", which represents a three-dimensional space surrounding X, and Y causes harmful interference to X when entering the three-dimensional space with its radio RX/TX status. A harm extent of the interference may be that the interference caused by Y makes X impossible to receive wanted signals. For ease of understanding, X may be considered as a primary node and Y as an interfering node.

There may be multiple IAB nodes in the IAB communication system, and the multiple IAB nodes may interfere with each other. In the presence of mutual interference, there may similarly be a power-limited area of Y for X. In a case that a single node interferes with multiple nodes, there may be a joint power-limited area of the multiple IAB nodes for the single node, for example, a joint power-limited area of X and Z for Y. Y may cause harmful interference to at least one of X and 7 when entering the three-dimensional space with its radio RX/TX status.

With respect to the power-limited area of X for Y, in the present disclosure, one or more of the following may hold true: X and Y are both controlled IAB nodes; X is a controlled TAB node and Y is an uncontrolled IAB node; X and Y are both static IAB nodes; X and Y are both dynamic IAB nodes; and one of X and Y is a static IAB node and the other is a dynamic IAB node.

In an embodiment, the electronic device 200 (specifically, the first control unit 202) may be configured to calculate a first power-limited area of the first IAB node for the second IAB node based on the basic information of the IAB nodes. The first power-limited area defines a three-dimensional space surrounding the first IAB node, and the second IAB node may cause harmful interference to the first IAB node when entering the first power-limited area with its radio RX/TX status. For example, the power-limited area of the IAB node 121 for the IAB node 122 may be calculated. The power-limited area may define a three-dimensional space surrounding the IAB node 121, and the IAB node 122 may cause harmful interference to the IAB node 121 when entering the power-limited area with its radio RX/TX status. It should be understood that a harm extent of the interference may be that the interference caused by the JAB node 122 makes the IAB node 121 impossible to receive wanted signals.

Figure 3:
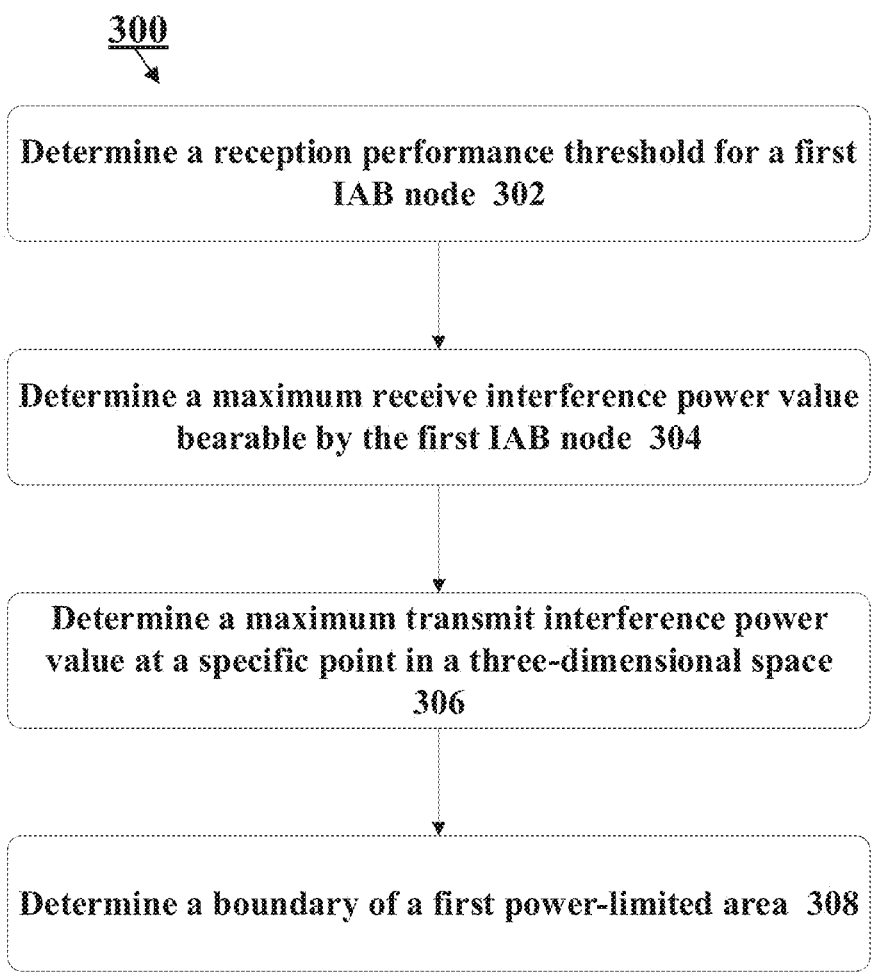
FIG. 3 illustrates an example operation for calculating a power-limited area according to an embodiment of the present disclosure.

FIG. 3 illustrates an example operation for calculating a power-limited area according to an embodiment of the present disclosure. In this example, the power-limited area is the first power-limited area of the first IAB node (for example, the IAB node 121) for the second IAB node (for example, the IAB node 122). This example operation can be performed by the electronic device 200 (specifically, the first control unit 202).

As shown in FIG. 3, the example operation 300 includes determining a reception performance threshold for the first IAB node based on interference protection requirements and system parameters for the first IAB node (block 302). It should be understood that the reception performance threshold may indicate a minimum reception performance requirement for the first IAB node to recover wanted signals from received signals containing noise and interference. In an embodiment, reception performance may be characterized by signal-to-noise ratio (SNR) and signal-to-interference-plus-noise ratio (SINR).

As shown in FIG. 3, the example operation 300 further includes determining, based on the reception performance threshold (which is determined at 302) for the first IAB node and current reception performance, a maximum receive interference power value currently bearable by the first IAB node (block 304). Using SINR as an example, the maximum receive interference power value currently bearable by the first IAB node can be determined when a SINR threshold for the first IAB node and a current SINR are known.

As shown in FIG. 3, the example operation 300 further includes determining a maximum transmit interference power value at a specific point in the three-dimensional space based on the maximum receive interference power value (determined at 304) and radio RX/TX statuses of the first IAB node and the second IAB node (block 306). In an embodiment, the radio RX/TX status includes one or more of antenna array configuration, beam configuration, transmit power, and current reception performance of corresponding IAB nodes. These factors may determine impact of wireless transmission of the second IAB node on the first IAB node. Therefore, by considering these factors, the maximum transmit interference power value can be determined more accurately. Due to continuity of the three-dimensional space, the space may be discretized (for example, a cube of 1 cubic meter is used as a calculation unit, and related parameters at its center position are selected for calculation or division is performed based on a spherical coordinate system) to calculate the maximum transmit interference power value at any position.

As shown in FIG. 3, the example operation 300 further includes determining a specific point at which the maximum transmit interference power value is equal to the transmit power of the second IAB node as a boundary of the first power-limited area (block 308). It should be understood that in order to avoid harmful interference to the first IAB node, the transmit power of the second IAB node on the boundary needs to be not greater than the maximum transmit interference power value, or the second IAB node needs to be prevented from entering the first power-limited area through the boundary.

In one embodiment, a maximum transmit interference power value at a specific point in the three-dimensional space may be determined by the following formula:

$$p_{max} = \frac{I_{th}}{\sum_{i=1}^{M} \sum_{j=1}^{N} \left[ \left( \frac{4\pi d_{ij}}{\lambda} \right)^{-n} |h_{ij}| \right]},$$

$$\text{where, } I_{th} = \frac{P}{\gamma_0} - N_0,$$

where, $p_{max}$ is a maximum transmit power of an interfering node allowed at the specific point, $I_{th}$ is a maximum interference allowed by the interfering node to a primary node, and $d_{ij}$ is, at the specific point, a distance between the j-th antenna element of a transmit antenna of the interfering node and the i-th antenna element of a receive antenna of the primary node, $\lambda$ is a wavelength of an operating frequency of the primary node, n is a radio wave propagation loss factor in free space, $h_{ij}$ is a channel coefficient (channel coefficient) from the j-th array element of the transmit antenna of the interfering node to the i-th array of the receive antenna of the primary node, M is the number of receive antenna elements of the primary node, N is the number of transmit antenna elements of the interfering node, p is a current receive power of the primary node, $\gamma_0$ is a SINR threshold for the primary node, and $N_0$ is a noise floor of a receiver of the primary node.

The transmit power of the interfering node is denoted as $p_0$, and a geometric pattern formed by the calculation unit of $p_{max} \leq p_0$ in the three-dimensional space is used as a power-limited area of the primary node for the interfering node. A spatial collection of specific points with $p_{max} = p_0$ forms the boundary of the power-limited area. When entering the power-limited area through the boundary, the interfering node may cause harmful interference to the primary node.

In a case that both the primary node and the interfering node use massive directional antennas, a distance difference between the elements of the transmit and receive antennas (as reflected in the above formula) may be considered for the operation 300, so as to improve the calculation accuracy.

Figure 4:
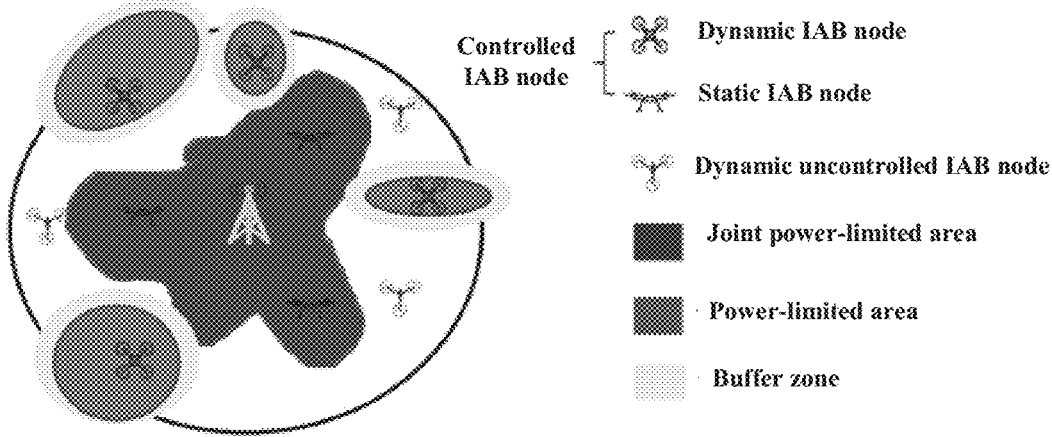
FIG. 4 illustrates a schematic diagram of a power-limited area according to an embodiment of the present disclosure.

Although FIG. 3 only illustrates determining of the first power-limited area of the first IAB node for the second IAB node, a joint power-limited area of multiple IAB nodes for the second IAB node may be similarly determined. In an embodiment, the electronic device 200 (specifically, the first control unit 202) may be configured to calculate a power-limited area of a third IAB node for the second IAB node, and take a union of the power-limited area of the third IAB node and the first power-limited area to form a joint power-limited area. The second IAB node can be controlled based on the joint power-limited area to suppress harmful interference of the second IAB node to both the first IAB node and the third IAB node. The power-limited area according to this embodiment of the present disclosure may be understood with reference to the schematic diagram in FIG. 4.

Figure 5:
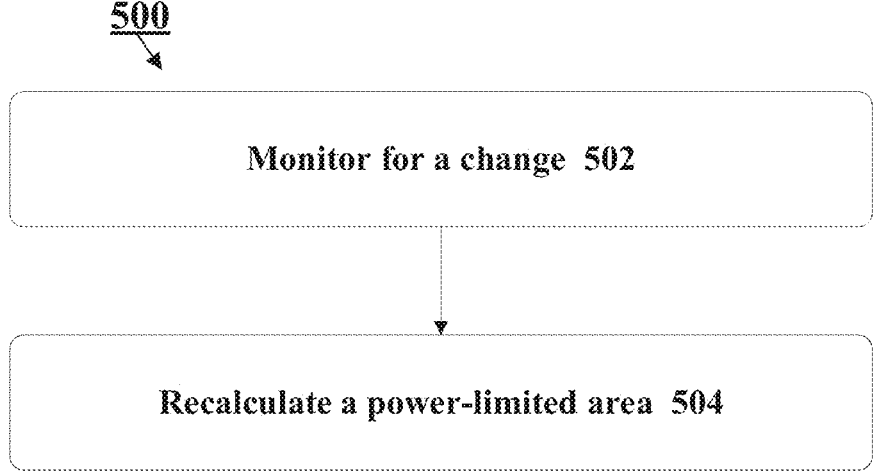
FIG. 5 illustrates an example operation for dynamically updating a power-limited area according to an embodiment of the present disclosure.

In the present disclosure, the power-limited area may be dynamically updated based on a change in the locations and radio RX/TX statuses of the first IAB node and the second IAB node. FIG. 5 illustrates an example operation for dynamically updating a power-limited area according to an embodiment of the present disclosure. This example operation can be performed by the electronic device 200 (specifically, the first control unit 202).

As shown in FIG. 5, the example operation 500 includes monitoring for a change in the locations and radio RX/TX statuses of the first IAB node and/or the second IAB node (block 502). The change may involve one or more of the location, antenna array configuration, beam configuration, and reception performance of the first IAB node. The change may involve one or more of the location, antenna array configuration, beam configuration, and transmit power of the second IAB node.

As shown in FIG. 5, the example operation 500 further includes recalculating a power-limited area of the first IAB node for the second IAB node upon determining a change in the location and radio RX/TX status of any IAB node (block 504). The power-limited area defines a three-dimensional space surrounding the first IAB node, and the second IAB node causes harmful interference to the first IAB node when entering the power-limited area with its current radio RX/TX status.

Interference Suppression Based on the Power-Limited Area

In the present disclosure, an IAB base station (including an IAB donor and an IAB node) can be controlled by, for example, the spectrum management device based on power-limited area(s), so as to suppress interference therebetween. In this way, spectrum resources can be used more efficiently and the number of accessed users can be increased. An example of interference suppression is described below still with reference to the first IAB node and the second IAB node.

In an embodiment, after determining the first power-limited area of the first IAB node for the second IAB node, the spectrum management device may perform at least one of the following control based on the first power-limited area and the location of the second IAB node: planning a motion path of the second IAB node to avoid entering the first power-limited area; or adjusting the radio RX/TX status of the second IAB node, including adjusting a beam direction of the second IAB node or reducing transmit power of the second IAB node, so as to reduce interfering signals received by the first IAB node from the second IAB node.

Further, the spectrum management device may receive an updated location of the second IAB node, and based on the first power-limited area and the updated location, update the control on the second IAB node to suppress interference from the second IAB node to the first IAB node. In an embodiment, the second IAB node may send its updated location at a period less than a channel correlation time (depending on a speed of the second IAB node).

In an embodiment, the spectrum management device may plan a motion path of the second IAB node based on the power-limited area (or the joint power-limited area) through a higher layer. For example, classic UAV path planning algorithms (such as ant colony algorithm, genetic algorithm, or particle swarm optimization algorithm) may be used in addition to control in the space domain via the power-limited area. Using the particle swarm optimization algorithm as an example, after a target location of each UAV under best coverage for existing user equipments in the IAB communication system is obtained, the UAV can be enabled to fly to the target location along a straight line and fly along the boundary of the limited area when approaching the power-limited area.

It should be understood that implementing control on the second IAB node before the second IAB node enters the power-limited area helps reduce interference to the first IAB node. In an ideal scenario, the second IAB node can be controlled before entering the power-limited area. The spectrum management device may determine, based on a velocity vector of the second IAB node and the first power-limited area, a time for controlling the second IAB node.

In an embodiment, a three-dimensional space with a specific depth surrounding the first power-limited area may be defined as a buffer zone. The buffer zone according to an embodiment of the present disclosure may be understood with reference to the schematic diagram in FIG. 4. Upon the second IAB node enters the buffer zone, configuration modification made by the spectrum management device for the second IAB node is implemented. With the buffer zone, it may be ensured that related operations are performed in advance before entry into the power-limited area. Therefore, setting the buffer zone can effectively prevent harmful interference to the first IAB node caused by a time delay of configuration modification for the second IAB node.

According to an implementation, the depth of the buffer zone surrounding the first power-limited area may be calculated by using the following formula:

$$d = |v| \cdot \sin\theta \cdot \cos\varphi \cdot t,$$

$$\text{where, } t = \frac{D_s}{\mu_s} + \frac{D_d}{\mu_d},$$

where, d represents the depth of the buffer zone; v is the velocity vector of the second IAB node; $\theta$ is an included angle between the velocity vector and a tangent plane of an incident point of the first power-limited area; $\varphi$ is an included angle between the velocity vector and a normal vector of an incident point of the first power-limited area; t is a time required for data processing by the spectrum management device; $D_s$ is the amount of data processed by the spectrum management device when the algorithm is executed; $D_d$ is the amount of data that the IAB donor needs to process when the algorithm is executed; and $\mu_s$ and $\mu_d$ are data processing speeds of the spectrum management device and the IAB donor, respectively.

This calculation method features high calculation efficiency and can accurately calculate the depth of the buffer zone to ensure timely configuration modification. Setting the buffer zone can avoid harmful interference between IAB nodes during the execution of the algorithm.

Figure 6:
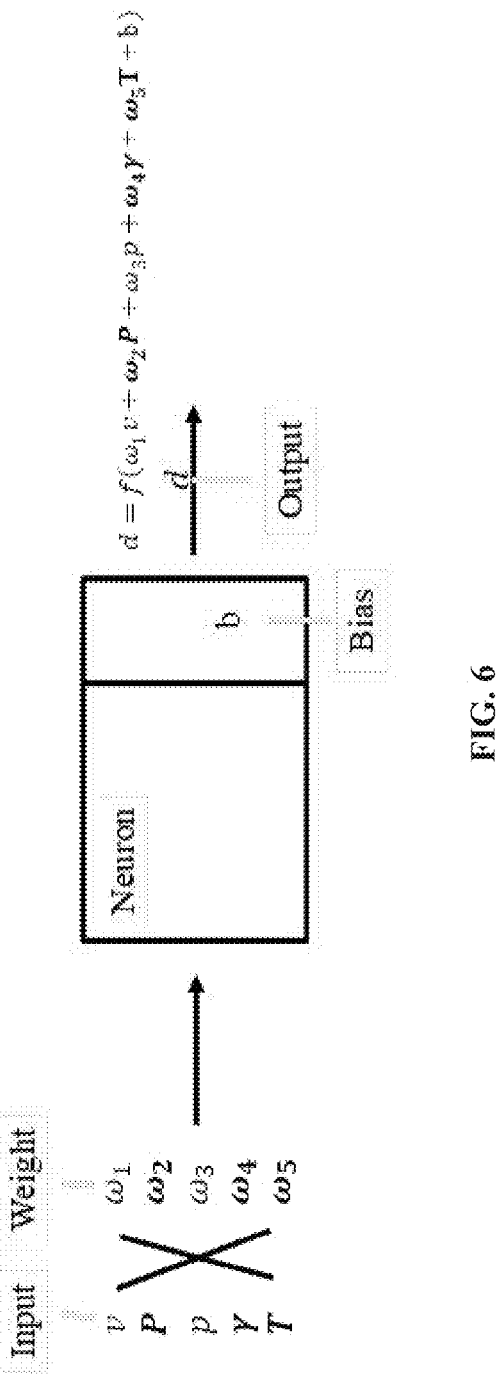
FIG. 6 illustrates an example model for training depth of a buffer zone using an artificial neural network according to an embodiment of the present disclosure.

According to another implementation, a machine learning method may alternatively be used to obtain the depth of the first power-limited area. FIG. 6 illustrates an example model for training the depth of the buffer zone using an artificial neural network according to the present disclosure. The depth of the buffer zone surrounding the first power-limited area may be calculated by using the following formula:

$$d=f(|v|,P,p,\gamma,T),$$

where, d is the depth of the buffer zone; v is the velocity vector of the second IAB node; P is a location set of the first IAB node, p is a transmit power of the second IAB node, $\gamma$ is a SINR set of the first IAB node, and T is a set of antenna types of the first IAB node. Before initialization, the model can be obtained through training based on the known parameters and the corresponding depth of the buffer zone (which is, for example, calculated by using the formula). Thereafter, the depth of the buffer zone can be directly obtained based on actual parameters.

Example Signaling Flow for Interference Suppression

Figure 7:
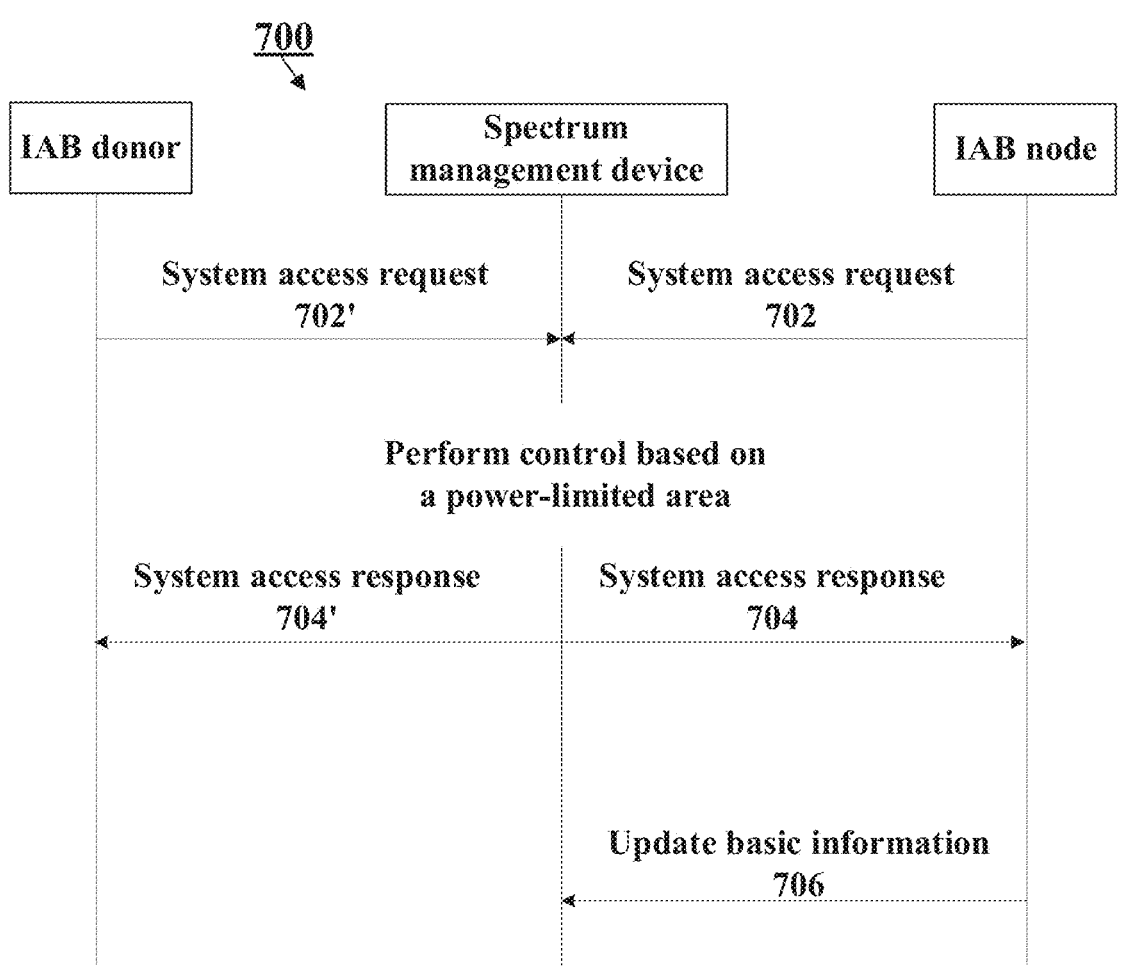
FIG. 7 illustrates a first example signaling flow for performing interference suppression on an IAB node according to an embodiment of the present disclosure.

FIG. 7 illustrates a first example signaling flow for performing interference suppression on an IAB node according to an embodiment of the present disclosure. With the example procedure 700, an IAB node and an IAB donor can access an IAB communication system to provide access services for user equipments.

As shown in FIG. 7, at 702, the IAB node may send a system access request to a spectrum management device; at 702', the IAB donor may also send a system access request to the spectrum management device. In an embodiment, the IAB node may be a controlled IAB node (for example, a macro IAB node), which may be dynamic or static. In an embodiment, the spectrum management device and the IAB donor may be implemented as a same device, and therefore the message at 702' is optional. The system access request may include basic information of the IAB node or the IAB donor, so as to indicate information such as a corresponding location and radio RX/TX status.

At 704, the spectrum management device may send a system access response message to the IAB node, to instruct the IAB node to access the IAB communication system; at 704', the spectrum management device may also send a system access response message to the IAB donor. In an embodiment, after receiving system access request messages from multiple IAB nodes, the spectrum management device may calculate power-limited area(s) based on the basic information therein and form control indications for the IAB nodes. Correspondingly, the system access response message may include indication information for controlling the IAB nodes. In another embodiment, the indication information for controlling the IAB nodes and the system access response message may be sent separately. Such control can help reduce harmful interference between IAB nodes, so as to utilize spectrum resources more efficiently and increase the number of users accessing the system.

At 706, optionally, the IAB node may send updated basic information to the spectrum management device, so that the spectrum management device recalculates a power-limited area based on the updated basic information. Correspondingly, the spectrum management device may update a control indication for the IAB node. For example, the IAB node may send its updated location based on a period less than a channel correlation time.

Figure 8:
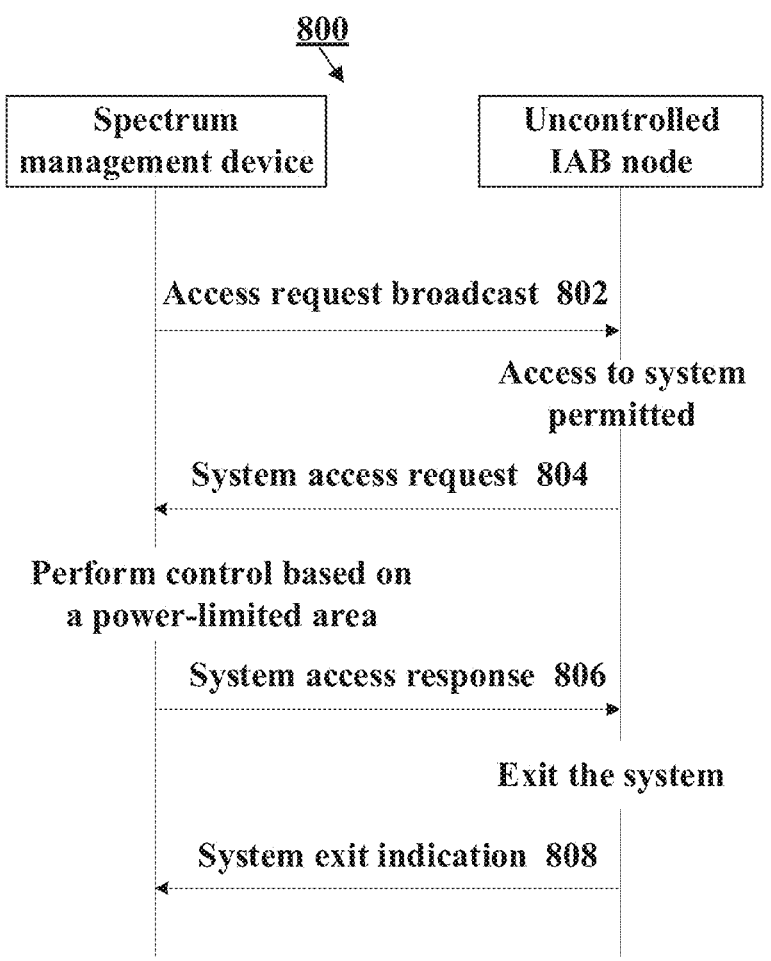
FIG. 8 illustrates a second example signaling flow for performing interference suppression on an IAB node according to an embodiment of the present disclosure.

FIG. 8 illustrates a second example signaling flow for performing interference suppression on an IAB node according to an embodiment of the present disclosure. With this example procedure 800, for example, in a case that the number of IAB nodes is insufficient or the load is excessively high, an uncontrolled IAB node (such as a Pico IAB node) may be enabled and connected to the IAB communication system, so as to provide communication services for user equipments.

As shown in FIG. 8, at 802, the spectrum management device may send an access request broadcast to an uncontrolled IAB node. For example, in a case that there is no available IAB base station in the IAB communication system to provide access services for specific user equipment, the spectrum management device may request the uncontrolled IAB node to access the system. After receiving the access request broadcast, the uncontrolled IAB node may determine, based on a preference configuration or based on choice of an owner, whether to respond to the access request.

In a case that access to the IAB communication system is permitted, at 804, the uncontrolled IAB node may send a system access request to the spectrum management device. The system access request may include basic information of the uncontrolled IAB node, so as to indicate information such as a corresponding location and radio RX/TX status.

At 806, the spectrum management device may send a system access response message to the uncontrolled IAB node, to indicate that the uncontrolled IAB node is to access the IAB communication system. Similar to the procedure 700, the spectrum management device may calculate the power-limited area based on the basic information of the uncontrolled IAB node, and form a control indication for the uncontrolled IAB node. The control indication may be sent to the uncontrolled IAB node along with or separately from the system access response message.

Under a specific condition, the uncontrolled IAB node may determine, based on preference configuration or based on choice of the owner, to exit the IAB communication system. The specific condition may include that access by user equipments is not detected or no user data is received within a given period of time, which indicates that an original IAB base station in the IAB communication system may have satisfied communication requirements. Correspondingly, at 808, the uncontrolled IAB node may send a system exit indication message to the spectrum management device, and return to an uncontrolled state.

Access Control for User Equipments

In the present disclosure, when harmful interferences between IAB nodes have been suppressed, the user equipment may access the IAB communication system through an appropriate IAB base station based on any appropriate criteria.

Figure 9:
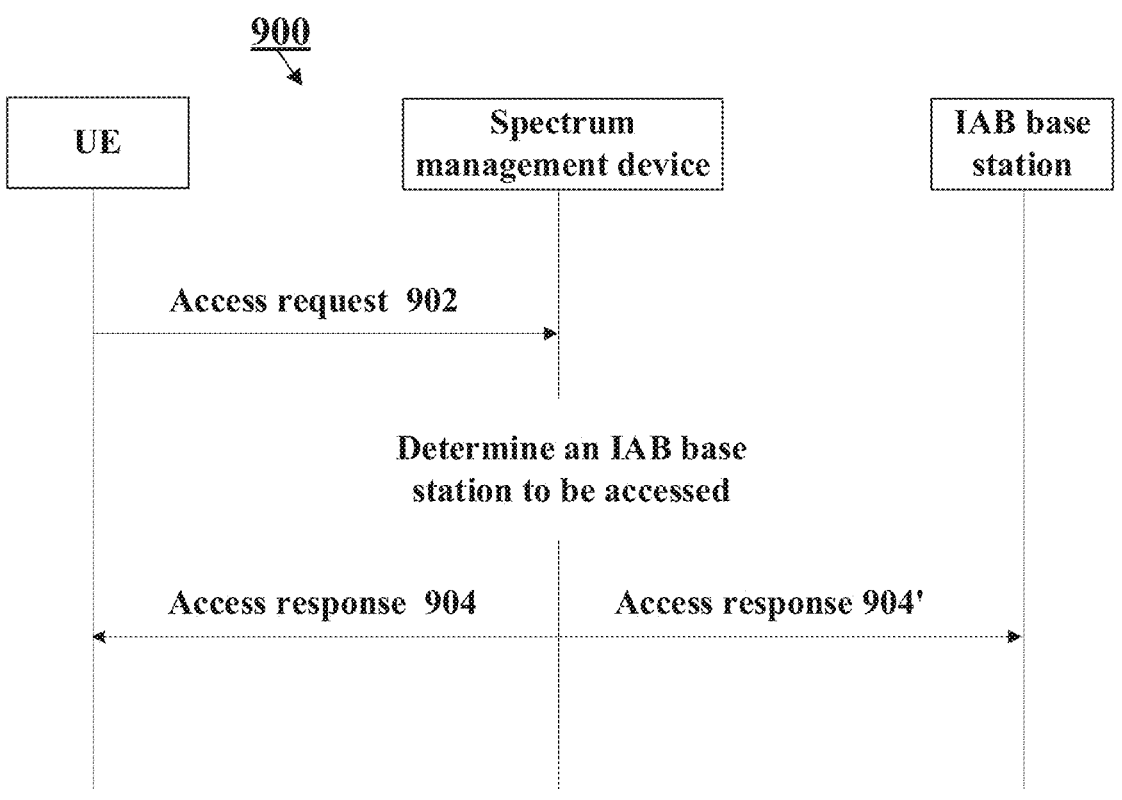
FIG. 9 illustrates an example signaling flow for performing access control for user equipments according to an embodiment of the present disclosure.

FIG. 9 illustrates an example signaling flow for performing access control for user equipments according to an embodiment of the present disclosure. In the description of the example flow 900, an IAB base station is used to represent both an IAB node and an IAB donor.

As shown in FIG. 9, at 902, the user equipment may send an access request message to a spectrum management device. In one embodiment, the access request message may include one or more of a location, service time, and service type of the user equipment. After receiving the access request message, the spectrum management device may determine, based on a specific criterion, an IAB base station to be accessed by the user equipment. The specific criterion may be based on factors such as the location, service time, or quality of service requirements of the user equipment.

At 904, after the IAB base station to be accessed is determined, the spectrum management device may send an access response message to the user equipment. For example, the access response message may include an IAB base station identifier to instruct the user equipment to access the IAB base station. Additionally, at 904', the spectrum management device may send an access response message to the IAB base station. For example, the access response message may include a user equipment identifier to instruct the IAB base station to accept access of the user equipment.

Figure 10:
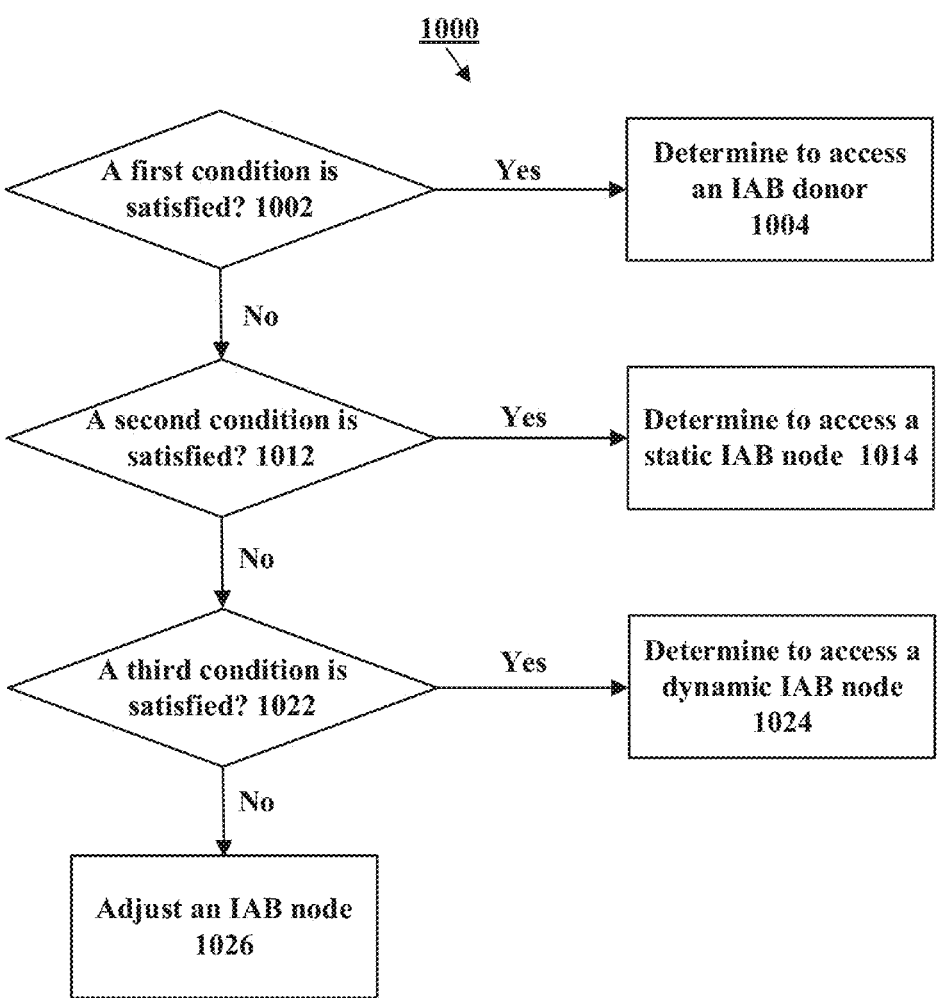
FIG. 10 illustrates an example operation for performing access control for user equipments according to an embodiment of the present disclosure.

FIG. 10 illustrates an example operation for performing access control for user equipments according to an embodiment of the present disclosure. The example operation 1000 may be executed by the electronic device 200 (specifically, the first control unit 202).

As shown in FIG. 10, at 1002, it may be determined whether a first condition is satisfied, and if the first condition is satisfied, 1004 is performed to determine that the user equipment is to access the IAB donor. The first condition may be, for example, that a distance between the user equipment and the IAB donor is smaller than a first threshold. If the first condition is not satisfied, 1012 may be performed to determine whether a second condition is satisfied. If the second condition is satisfied, 1014 is performed to determine that the user equipment is to access a static IAB node (for example, based on the location, service time, service type, quality of service requirements, or the like of the user equipment). The second condition may be, for example, that the static IAB node is a static IAB node closest to the user equipment or capable of providing best throughput. If the second condition is not satisfied, 1022 may be performed to determine whether a third condition is satisfied. If the third condition is satisfied, 1024 may be performed to determine that the user equipment is to access a dynamic IAB node (for example, based on the location, service time, service type, quality of service requirements, or the like of the user equipment). The third condition may be, for example, that the dynamic IAB node is a dynamic IAB node closest to the user equipment or capable of providing best throughput. If the third condition is not satisfied, 1026 may be performed to adjust an IAB node in the system, so as to provide access for the user equipment.

It should be understood that access control for the user equipment in FIG. 10 is only an example. Based on a use scenario, the user equipment may preferentially access to any IAB base station that best satisfies communication requirements.

Figure 11:
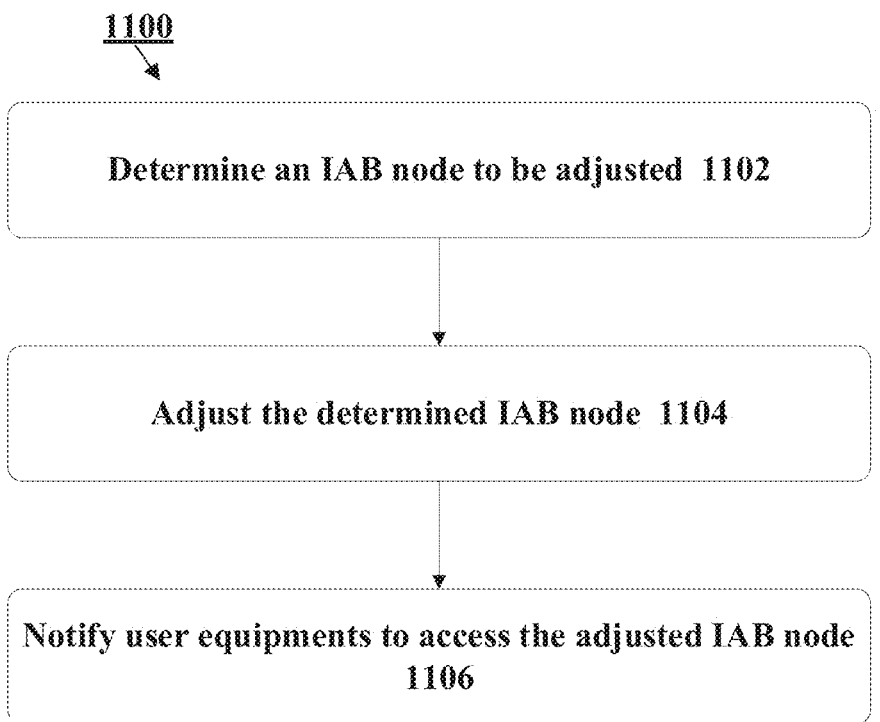
FIG. 11 illustrates an example operation for adjusting an IAB node to provide access for a user equipment according to an embodiment of the present disclosure.

FIG. 11 illustrates an example operation for adjusting an IAB node to provide access for user equipments according to an embodiment of the present disclosure. The example operation 1100 may be performed by an electronic device 200.

As shown in FIG. 11, at 1102, an IAB node to be adjusted may be determined. For example, an IAB node closest to a user equipment may be determined as the IAB node to be adjusted. The IAB node may be dynamic or static. Further, based on a joint power-limited area for the IAB node, an adjustment operation for the IAB node may be determined so as to provide access for the user equipment while avoiding harmful interferences to other IAB nodes. In an embodiment, the adjustment operation may include planning a motion path of the IAB node, so as to approach the user equipment in a manner of avoiding entering the joint power-limited area. The adjustment operation may further include adjusting a radio RX/TX status of the IAB node, for example, adjusting a beam direction to point to the user equipment or increasing the transmit power of the IAB node.

At 1104, the adjustment may be performed for the determined IAB node. At 1106, the user equipment may be notified to access the adjusted IAB node.

Example Method

Figure 12A:
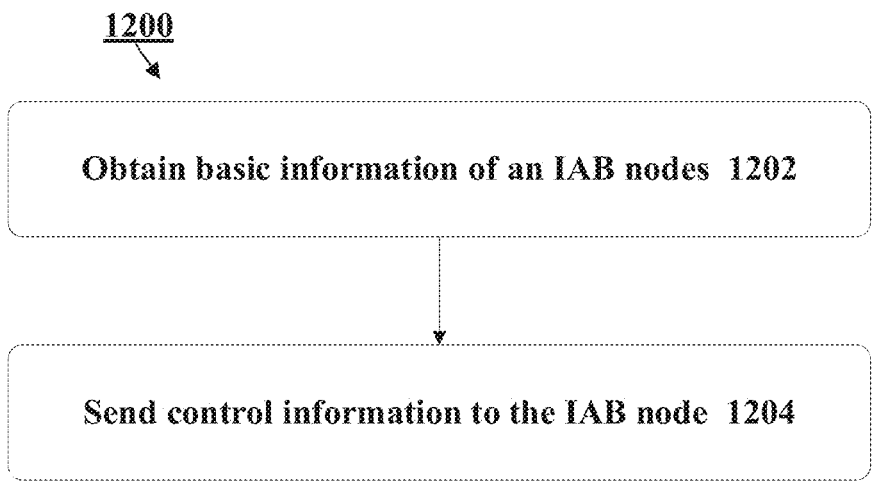
FIG. 12A illustrates an example method for an IAB communication system according to an embodiment of the present disclosure.

FIG. 12A illustrates an example method for an IAB communication system according to an embodiment of the present disclosure. The method may be executed by a spectrum management device or the electronic device 200 in the IAB communication system 100. As shown in FIG. 12A, the method 1200 may include obtaining basic information of an IAB node (for example, a first IAB node and a second IAB node) (block 1202). The basic information may include a location and radio RX/TX status of a corresponding IAB node. The location may represent a single location of the corresponding IAB node in the three-dimensional space; or represent multiple locations of the IAB node in the three-dimensional space at specific times, for example, the location information may be in a form of motion path or track. The radio RX/TX status may include one or more of antenna array configuration, beam configuration, transmit power, and current reception performance of the corresponding IAB node. The method 1200 may further include sending control information to the IAB node (block 1204), so as to suppress harmful interference between IAB base stations. For example, control information may be sent to the second IAB node. The control information includes at least one of path information and adjustment information for the radio RX/TX status. The path information may instruct the second IAB node to avoid approaching the first IAB node. The adjustment information for the radio RX/TX status may instruct adjusting a beam direction of the second IAB node or adjusting (for example, decreasing or increasing) transmit power of the second IAB node. For understanding on more details of this method, reference may be made to the foregoing description of the spectrum management device or the electronic device 200.

In an embodiment, one or more of the following exist: the first IAB node and the second IAB node are controlled IAB nodes; the first IAB node is a controlled IAB node, and the second IAB node is an uncontrolled IAB node; the first IAB node and the second IAB node are static IAB nodes; the first IAB node and the second IAB node are dynamic IAB nodes; or one of the first IAB node and the second IAB node is a static IAB node, and the other is a dynamic IAB node.

In an embodiment, the controlled IAB node includes a macro IAB node, and the uncontrolled IAB node includes a Pico IAB node; and/or at least one of the static IAB node and the dynamic IAB node is implemented by an unmanned aerial vehicle.

In an embodiment, the method further includes: calculating, based on the basic information, a first power-limited area of the first IAB node for the second IAB node, where the first power-limited area defines a three-dimensional space surrounding the first IAB node, and the second IAB node will cause harmful interference to the first IAB node when entering the first power-limited area with its radio RX/TX status. The path information instructs the second IAB node to avoid entering the first power-limited area, and/or the adjustment information for the radio RX/TX status instructs the second IAB node to adjust the beam direction or reduce the transmit power when entering the first power-limited area.

In an embodiment, calculating a first power-limited area of the first IAB node for the second IAB node includes: determining a threshold for reception performance of the first IAB node based on interference protection requirements and system parameters; determining a maximum receive interference power value bearable for the first IAB node, based on the threshold for the reception performance and current reception performance of the first IAB node; determining a maximum transmit interference power value at a specific point in a three-dimensional space, based on the maximum receive interference power value and the radio RX/TX statuses of the first IAB node and the second IAB node; and determining a specific point at which the maximum transmit interference power value is equal to the transmit power of the second IAB node as a boundary of the first power-limited area of the first IAB node for the second IAB node.

In an embodiment, the method further includes: receiving an updated location of the second IAB node, where the second IAB node provides the updated location in a period less than a channel correlation time; and based on the updated location, transmitting updated control information to the second IAB node, where the updated control information includes updated path information and/or updated adjustment information for the radio RX/TX status.

In an embodiment, the method further includes: based on a speed vector of the second IAB node and the first power-limited area, determining timing for updating control of the second IAB node.

In an embodiment, the method further includes: upon adjustment of the radio RX/TX status of the second IAB node, calculate a second power-limited area of the first IAB node for the second IAB node, where the second power-limited area defines a three-dimensional space surrounding the first IAB node, and the second IAB node will cause harmful interference to the first IAB node when entering the second power-limited area with its adjusted radio RX/TX status.

In an embodiment, the method further includes: calculating a third power-limited area of a third IAB node for the second IAB node, and taking a union of the first power-limited area and the third power-limited area to form a joint power-limited area of the two, where the third power-limited area defines a three-dimensional space surrounding the third IAB node, and the second IAB node will cause harmful interference to the third IAB node when entering the third power-limited area with its radio RX/TX status. The path information instructs the second IAB node to avoid entering the joint power-limited area, and/or the adjustment information for the radio RX/TX status instructs the second IAB node to adjust the beam direction or to reduce the transmit power when entering the joint power-limited area.

In an embodiment, the method further includes: receiving a system access request message from the second IAB node; and sending a system access response message to the second IAB node, where the response message includes the control information for the second IAB node.

In an embodiment, the method further includes: receiving an access request from a first user equipment, where the access request includes one or more of a location, a service demand time, and a service type of the first user equipment; and based on the access request, sending an access response to of the first user equipment and at least one of the IAB donor and multiple IAB nodes, so as to instruct the first user equipment to access the at least one of the IAB donor and the multiple IAB nodes.

In an embodiment, the method further includes: based on a distance between the first user equipment and the IAB donor being less than a first threshold, preferentially determining that the first user equipment accesses the IAB donor; based on the location of the first user equipment, preferentially determining that the first user equipment accesses a closest static IAB node in the multiple IAB nodes; or based on the service type of the first user equipment, preferentially determining that the first user equipment accesses a static IAB node capable of providing optimal throughput in the multiple IAB nodes.

In an embodiment, the method further includes: if the IAB donor and the static IAB node are not available, determine that the first user equipment accesses a dynamic IAB node closest or capable of providing optimal throughput in the multiple IAB nodes.

In an embodiment, the method further includes: determining that the second IAB node is a dynamic IAB node; based on a first power-limited area, adjusting the second IAB node to cover the first user equipment; and determining that the first user equipment accesses the second IAB node. The adjusting includes at least one of moving the second IAB node based on the first power-limited area, adjusting a beam direction of the second IAB node, or increasing a transmit power of the second IAB node.

In an embodiment, the method further includes: sending an access request broadcast to one or more uncontrolled IAB nodes; receiving basic information from an uncontrolled fourth IAB node; based on the basic information, calculating a fourth power-limited area of the first IAB node for the fourth IAB node, where the fourth power-limited area defines a three-dimensional space surrounding the first IAB node, and the fourth IAB node will cause harmful interference to the first IAB node when entering the fourth power-limited area with its radio RX/TX status; and sending control information to the fourth IAB node, where the control information includes at least one of the following: path information, for instructing the fourth IAB node to avoid approaching the first IAB node; or adjustment information for the radio RX/TX status, for instructing of adjusting beam direction of the fourth IAB node or reducing transmit power of the fourth IAB node.

Figure 12B:
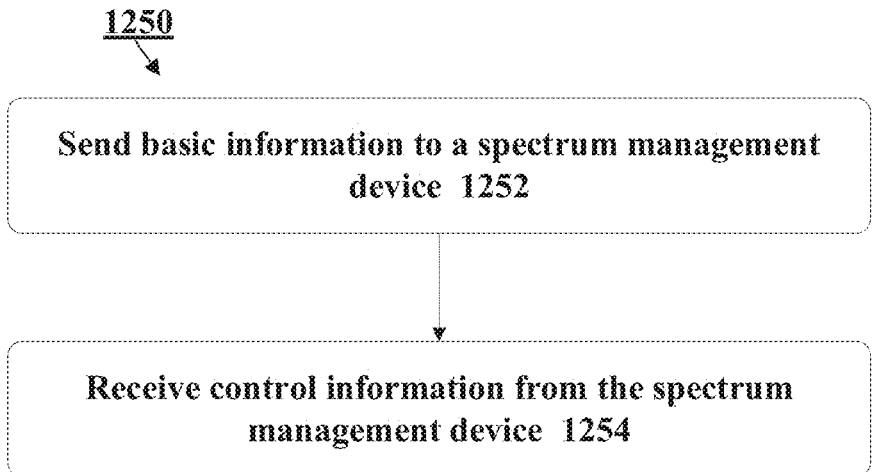
FIG. 12B illustrates an example method for an IAB node according to an embodiment of the present disclosure.

FIG. 12B illustrates an example method for an IAB node according to an embodiment of the present disclosure. The method may be executed by an IAB node (for example, a second IAB node) or the electronic device 250 in the IAB communication system 100. As shown in FIG. 12B, the method 1250 may include sending basic information of the IAB node to the spectrum management device (block 1252). The basic information may include a location and radio RX/TX status of the IAB node. The method 1250 may further include: receiving control information from the spectrum management device (block 1254). Corresponding to the method 1200, the control information includes at least one of path information and adjustment information for the radio RX/TX status. For understanding on more details of the method 1250, reference may be made to the foregoing descriptions about the method 1200 and the IAB node or the electronic device 250, and details are not repeated herein.

Various exemplary electronic devices and methods according to embodiments of the present disclosure have been described above. It should be understood that the operations or functions of these electronic devices may be combined with each other to implement more or less operations or functions than described. The operational steps of the methods can also be combined with each other in any suitable order, so that similarly more or fewer operations are achieved than described.

It should be understood that the machine-executable instructions in the machine-readable storage medium or program product according to the embodiments of the present disclosure can be configured to perform operations corresponding to the device and method embodiments described above. When referring to the above device and method embodiments, the embodiments of the machine-readable storage medium or the program product are clear to those skilled in the art, and therefore description thereof will not be repeated herein. A machine-readable storage media and a program product for carrying or including the above-described machine-executable instructions also fall within the scope of the present disclosure. Such storage medium can include, but is not limited to, a floppy disk, an optical disk, a magneto-optical disk, a memory card, a memory stick, and the like. In addition, it should be understood that the above series of processing and devices may alternatively be implemented by software and/or firmware.

Figure 13:
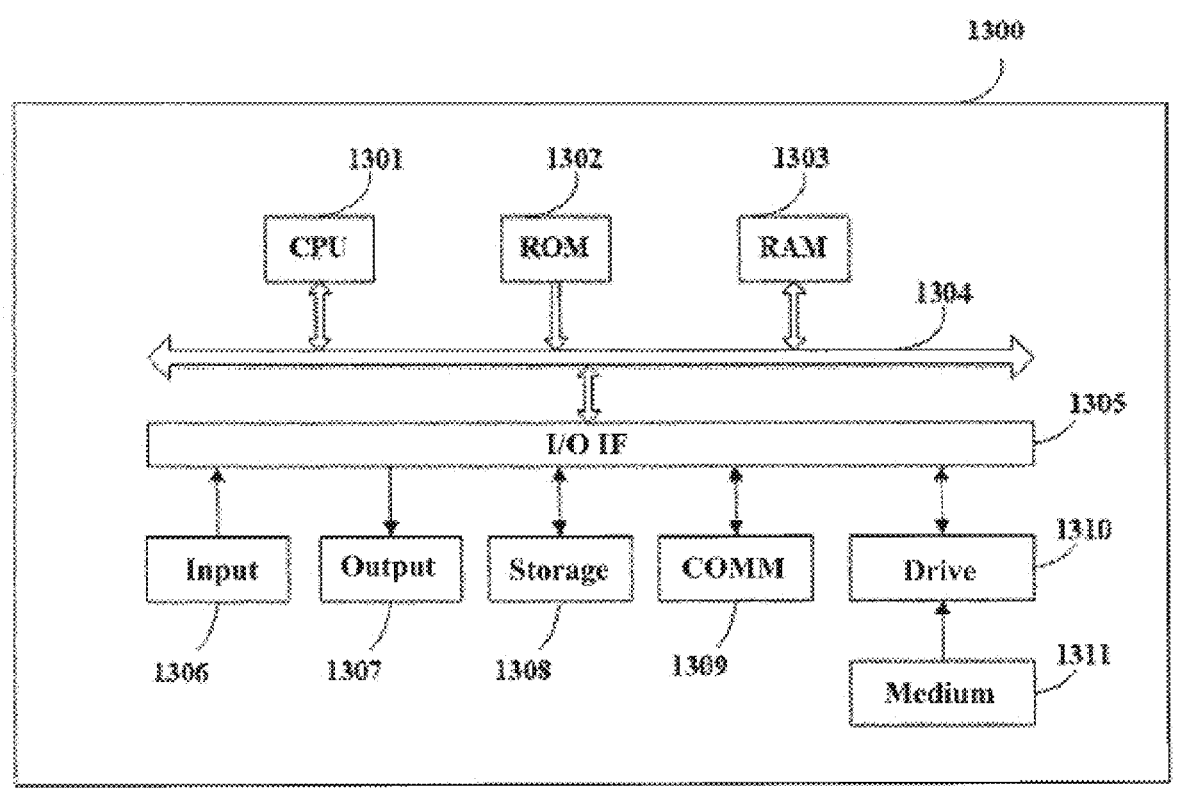
FIG. 13 illustrates an example block diagram of a computer capable of being implemented as a spectrum management device or an IAB base station according to an embodiment of the present disclosure.

In addition, it should be understood that the above series of processing and devices may alternatively be implemented by software and/or firmware. In a case of implementation by software and/or firmware, a program constituting the software is installed from a storage medium or a network to a computer having a dedicated hardware structure, such as a general-purpose computer 1300 shown in FIG. 13. Various functions and the like can be performed after various programs are installed on the computer. FIG. 13 illustrates an example block diagram of a computer capable of being implemented as a spectrum management device or IAB base station according to an embodiment of the present disclosure.

In FIG. 13, a central processing unit (CPU) 1301 executes various processes according to programs stored in a read only memory (ROM) 1302 or programs loaded from a storage portion 1308 to a random access memory (RAM) 1303. In the RAM 1303, data required when the CPU 1301 executes various processes and the like are also stored as needed.

The CPU 1301, the ROM 1302, and the RAM 1303 are connected to each other via a bus 1304. The input/output interface 1305 is also connected to the bus 1304.

The following parts are connected to the input/output interface 1305: an input portion 1306, including a keyboard, a mouse, and the like; an output portion 1307, including a display such as a cathode ray tube (CRT) or a liquid crystal display (LCD), and a speaker. The storage portion 1308 includes a hard disk and the like; and a communication portion 1309 includes a network interface card such as a LAN card and a modem. The communication portion 1309 performs communication processing via a network such as the Internet.

A drive 1310 is also connected to the input/output interface 1305 as needed. A removable medium 1311 such as a magnetic disk, an optical disc, a magneto-optical disc, or a semiconductor memory is installed in the drive 1310 as needed, so that a computer program read therefrom is installed into the storage portion 1308 as needed.

In a case that the above-described series of processes are implemented by software, programs constituting the software are installed from a network such as the Internet or from a storage medium such as the removable medium 1311.

Those skilled in the art should understand that such storage medium is not limited to the removable medium 1311 storing a program and distributing a program separately from the device to the user, as shown in FIG. 13. Examples of the removable medium 1311 include magnetic disk (including floppy disk (registered trademark)), optical disc (including compact disk read-only memory (CD-ROM) and digital versatile disks (DVD)), magneto-optical disk (including minidisc (MD)(registered trademark)), and semiconductor memory. Alternatively, the storage medium may be the ROM 1302, a hard disk contained in the storage portion 1308, or the like, in which programs are stored and distributed to the user along with a device containing them.

The technology of the present disclosure can be applied to various products. For example, the base stations mentioned in the present disclosure can be implemented as any type of evolved Node B (gNB), such as a macro gNB and a small gNB. The small gNB may be a gNB covering a cell smaller than the macro cell, for example, a pico gNB, a micro gNB, and a home (femto) gNB. Alternatively, the base station can be implemented as any other type of base station, such as a NodeB and a base transceiver station (Base Transceiver Station, BTS). The base station can include: a body (also referred to as a base station device) configured to control radio communication; and one or more remote radio heads (Remote Radio Head, RRH) disposed at a different location from the body. In addition, various types of terminals which will be described below can each operate as a base station by performing base station functions temporarily or semi-persistently.

Use cases according to the present disclosure will be described below with reference to FIGS. 14 to 15.

[Use Cases for Base Station]

First Use Case

Figure 14:
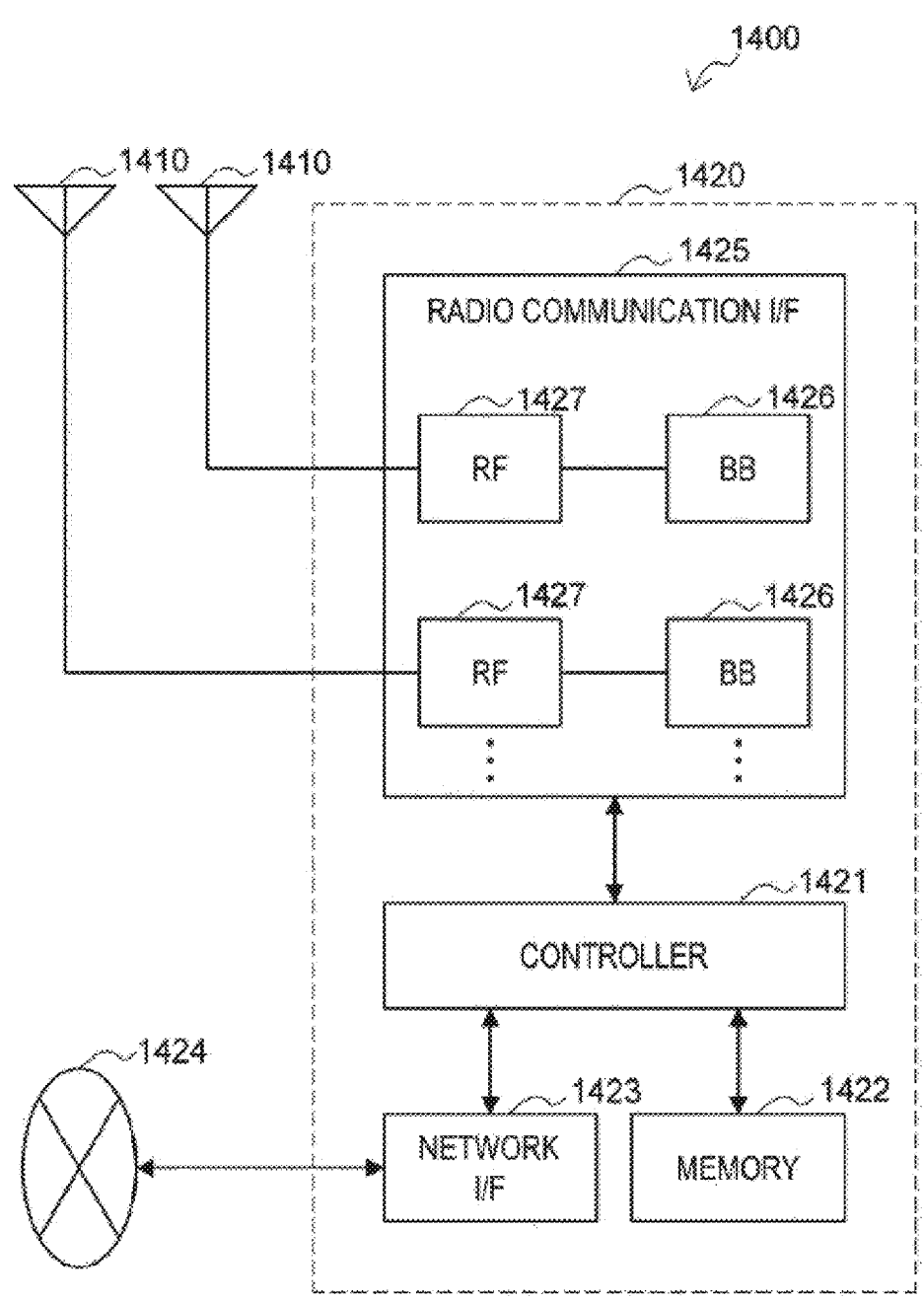
FIG. 14 illustrates a block diagram of a first example of a schematic configuration of a gNB to which the technology of the present disclosure can be applied.

FIG. 14 illustrates a block diagram of a first example of a schematic configuration of a gNB to which the technology in content of the present disclosure is applicable. The gNB 1400 includes multiple antennas 1410 and a base station device 1420. The base station device 1420 and each antenna 1410 may be connected to each other via an RF cable. In one implementation, the gNB 1400 (or base station device 1420) herein may correspond to the electronic devices 300A, 1300A, and/or 1500B described above.

Each of the antennas 1410 includes a single or multiple antenna elements (such as multiple antenna elements included in a multiple input and multiple output (MIMO) antenna), and is used for the base station device 1420 to transmit and receive radio signals. As shown in FIG. 14, the gNB 1400 may include multiple antennas 1410. For example, the multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, the controller 1421 generates data packets from data in signals processed by the radio communication interface 1425, and transfers the generated packets via the network interface 1423. The controller 1421 can bundle data from multiple baseband processors to generate the bundled packets, and transfer the generated bundled packets. The controller 1421 may have logic functions of performing control such as radio resource control, radio bearer control, mobility management, admission control, and scheduling. This control may be performed in corporation with a gNB or a core network node in the vicinity. The memory 1422 includes a RAM and a ROM, and stores a program that is executed by the controller 1421 and various types of control data (such as a terminal list, transmit power data, and scheduling data).

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface (such as an S1 interface and an X2 interface). The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes (such as Long Term Evolution (LTE), LTE-Advanced, and NR), and provides, via the antenna 1410, radio connection to a terminal located in a cell of the gNB 1400. The radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers (such as L1, Medium Access Control (MAC), Radio Link Control (RLC), and Packet Data Convergence Protocol (PDCP)). Instead of the controller 1421, the BB processor 1426 may have a part or all of the logic functions described above. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG. 14 illustrates an example in which one RF circuit 1427 is connected to one antenna 1410, the present disclosure is not limited to thereto; rather, one RF circuit 1427 may be connected to multiple antennas 1410 at the same time.

As illustrated in FIG. 14, the radio communication interface 1425 may include the multiple BB processors 1426. For example, the multiple BB processors 1426 may be compatible with multiple frequency bands used by gNB 1400. As illustrated in FIG. 14, the radio communication interface 1425 may include the multiple RF circuits 1427. For example, the multiple RF circuits 1427 may be compatible with multiple antenna elements. Although FIG. 14 illustrates the example in which the radio communication interface 1425 includes the multiple BB processors 1426 and the multiple RF circuits 1427, the radio communication interface 1425 may also include a single BB processor 1426 or a single RF circuit 1427.

Second Use Case

Figure 15:
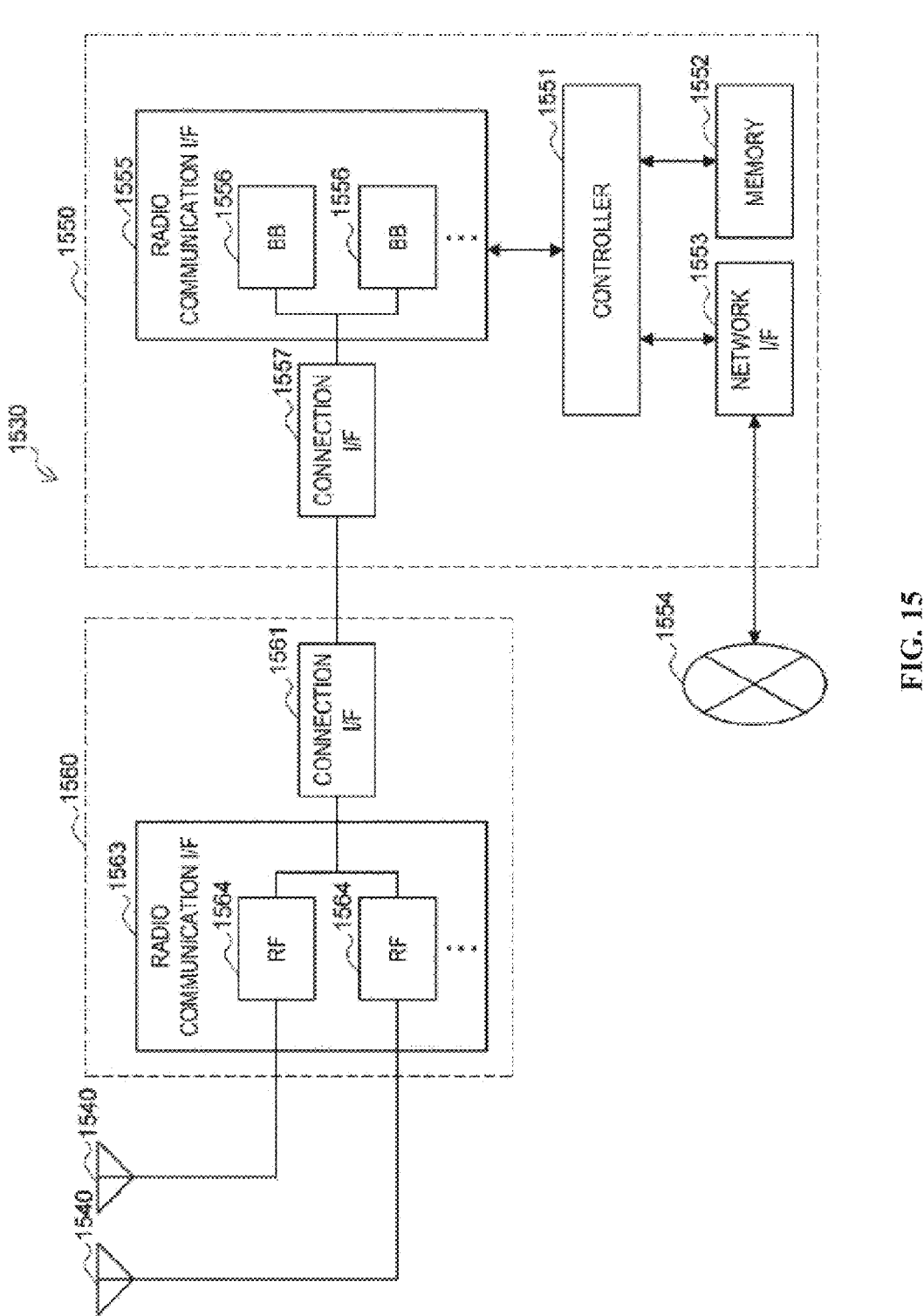
FIG. 15 illustrates a block diagram of a second example of a schematic configuration of a gNB to which the technology of the present disclosure can be applied

FIG. 15 illustrates a block diagram of a second example of a schematic configuration of a gNB to which the technology in content of the present disclosure is applicable. The gNB 1530 includes multiple antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the gNB 1530 (or base station device 1550) herein may correspond to the electronic devices 300A, 1300A, and/or 1500B described above.

Each of the antennas 1540 includes a single or multiple antenna elements such as multiple antenna elements included in a MIMO antenna and is used for the RRH 1560 to transmit and receive radio signals. As shown in FIG. 15, the gNB 1530 may include multiple antennas 1540. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 14.

The radio communication interface 1555 supports any cellular communication scheme (such as LTE, LTE-Advanced, and NR) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 14, except that the BB processor 1556 is connected to the RF circuit 1564 of the RRH 1560 via the connection interface 1557. As illustrated in FIG. 15, the radio communication interface 1555 may include the multiple BB processors 1556. For example, the multiple BB processors 1556 may be compatible with multiple frequency bands used by the gNB 1530. Although FIG. 15 illustrates the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. The radio communication interface 1563 may typically include, for example, the RF circuitry 1564. The RF circuit 1564 may include, for example, a mixer, a filter, and an amplifier, and transmits and receives radio signals via the antenna 1540. Although FIG. 15 illustrates an example in which one RF circuit 1564 is connected to one antenna 1540, the present disclosure is not limited to thereto; rather, one RF circuit 1564 may be connected to multiple antennas 1540 at the same time.

As illustrated in FIG. 15, the radio communication interface 1563 may include the multiple RF circuits 1564. For example, the multiple RF circuits 1564 may support multiple antenna elements. Although FIG. 15 illustrates the example in which the radio communication interface 1563 includes the multiple RF circuits 1564, the radio communication interface 1563 may also include a single RF circuit 1564.

Simulation and Verification

Figure 16A:
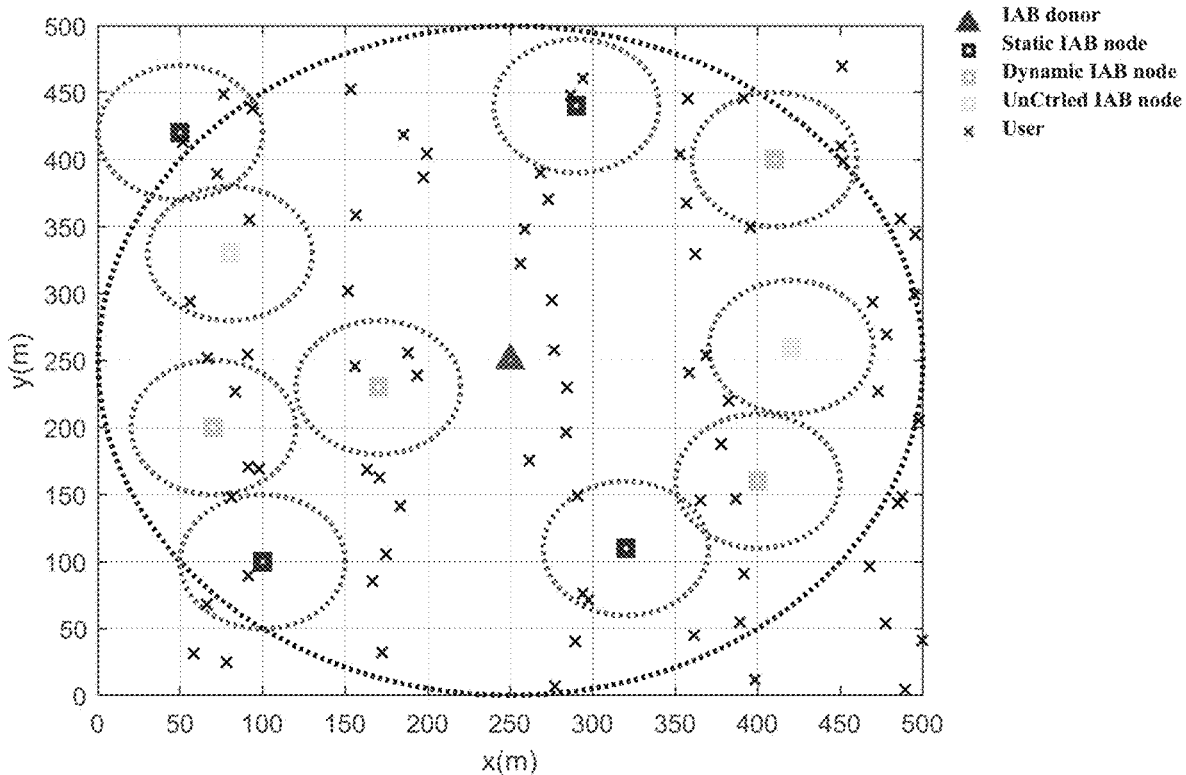

FIGS. 16A to 18 illustrate example simulation settings and simulation performance related to the solution according to the present disclosure. In this simulation, a static macro base station is used as an IAB donor, and UAVs carrying directional antennas are used as IAB nodes. In the simulation scenario, the IAB donor remains static, and the IAB nodes include dynamic and static nodes. The simulation scenario is shown in FIG. 16A, and simulation parameters are shown in FIG. 16B. Specifically, one IAB donor and ten IAB nodes are provided in the simulation scenario, the ten IAB nodes including 4 static IAB nodes, 4 dynamic IAB nodes, and 2 Pico IAB nodes (both supporting mobility). Five hundred user equipments are randomly distributed.

Figure 17:
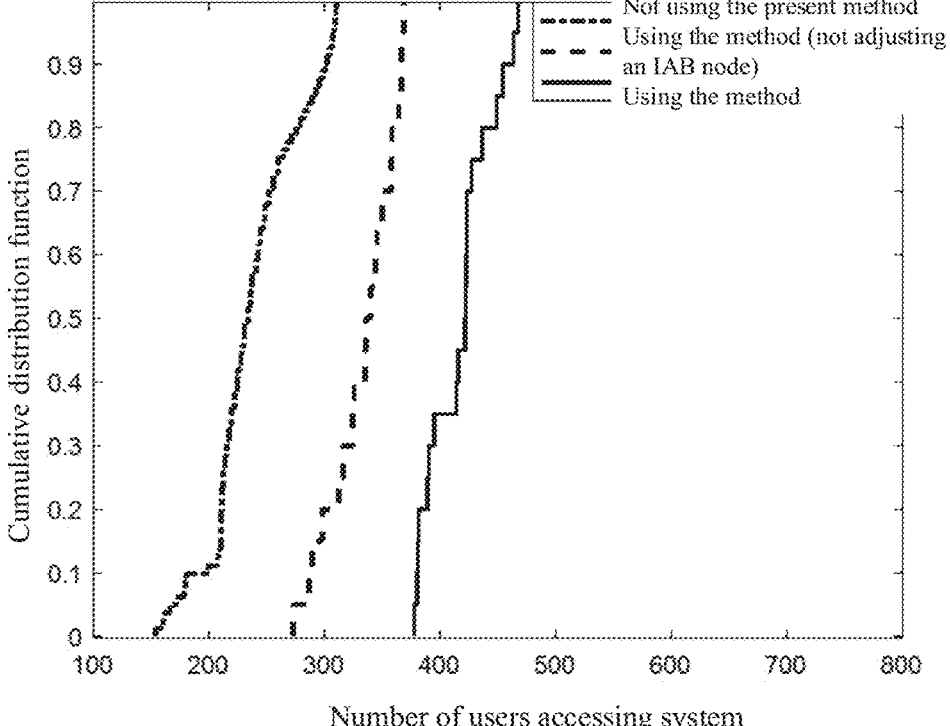

FIG. 17 illustrates simulation analysis of the number of users accessing IAB nodes. It can be learned from the cumulative distribution function curve that the system without using the solution of the present disclosure supports normal access of about 200 user equipments; the system using the solution of the present disclosure and including no dynamically adjusted Pico IAB nodes supports normal access of about 300 user equipments; and the system using the solution of the present disclosure and including dynamically adjusted Pico IAB nodes supports normal access of about 450 users. It can be learned that the solution of the present disclosure can expand access coverage supported by a cell and increase the number of users accessing the system.

Figure 18:
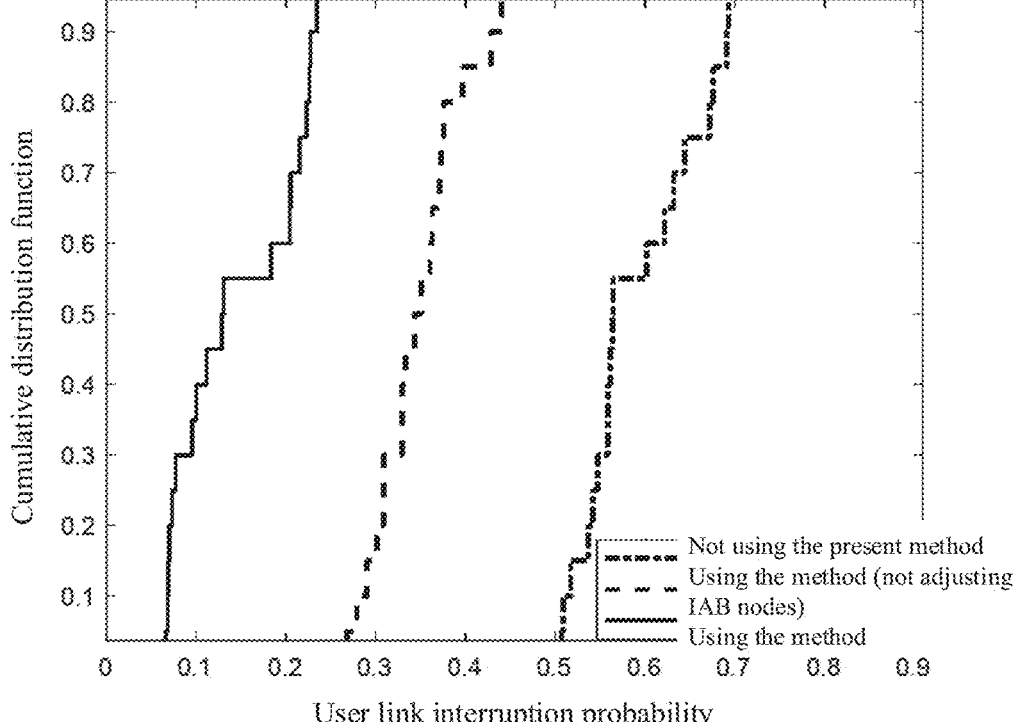

FIG. 18 illustrates simulation analysis of user link interruption probability. It can be learned from the cumulative distribution function curve that the user link interruption probability is about 65% when the solution of the present disclosure is not used; the user link interruption probability is reduced to 38% when the solution of the present disclosure is used without including dynamically adjusted Pico IAB nodes; and the user link interruption probability is reduced to 17% when the solution of the present disclosure is used including dynamically adjusted Pico IAB nodes. It can be learned that the solution of the present disclosure can reduce the user access link interruption probability.

The solution of the present disclosure may be implemented in the following example manners.

Clause 1. An electronic device for an integrated access and backhaul (IAB) communication system, where the IAB communication system includes an IAB donor and at least a first IAB node and a second IAB node, operating frequency bands of the IAB donor and the IAB nodes at least partially overlap, and the electronic device includes a processing circuit, the processing circuit being configured to:
obtain basic information of the first IAB node and the second IAB node, where the basic information includes a location and radio RX/TX status of a corresponding IAB node, and the radio RX/TX status includes one or more of antenna array configuration, beam configuration, transmit power, and current reception performance of the corresponding IAB node; and
send control information to the second IAB node, where the control information includes at least one of the following:
path information, for instructing the second IAB node to avoid approaching the first IAB node; or
adjustment information for the radio RX/TX status, for instructing of adjusting beam direction of the second IAB node or reducing transmit power of the second IAB node.

Clause 2. The electronic device of clause 1, where one or more of the following exist:
the first IAB node and the second IAB node are controlled IAB nodes;
the first IAB node is a controlled IAB node, and the second IAB node is an uncontrolled IAB node;
the first IAB node and the second IAB node are static IAB nodes;
the first IAB node and the second IAB node are dynamic IAB nodes; or
one of the first IAB node and the second IAB node is a static IAB node, and the other is a dynamic IAB node.

Clause 3. The electronic device of clause 2, where
the controlled IAB node includes a macro IAB node, and the uncontrolled IAB node includes a Pico IAB node; and/or
at least one of the static IAB node and the dynamic IAB node is implemented by an unmanned aerial vehicle.

Clause 4. The electronic device of clause 1, where the processing circuit is further configured to calculate, based on the basic information, a first power-limited area of the first IAB node for the second IAB node, where the first power-limited area defines a three-dimensional space surrounding the first IAB node, and the second IAB node will cause harmful interference to the first IAB node when entering the first power-limited area with its radio RX/TX status,
where the path information instructs the second IAB node to avoid entering the first power-limited area, and/or
where the adjustment information for the radio RX/TX status instructs the second IAB node to adjust the beam direction or reduce the transmit power when entering the first power-limited area.

Clause 5. The electronic device of clause 1, where calculating a first power-limited area of the first IAB node for the second IAB node includes:
determining a threshold for reception performance of the first IAB node based on interference protection requirements and system parameters;
determining a maximum receive interference power value bearable for the first IAB node, based on the threshold for the reception performance and current reception performance of the first IAB node;
determining a maximum transmit interference power value at a specific point in a three-dimensional space, based on the maximum receive interference power value and the radio RX/TX statuses of the first IAB node and the second IAB node; and
determining a specific point at which the maximum transmit interference power value is equal to the transmit power of the second IAB node as a boundary of the first power-limited area of the first IAB node for the second IAB node.

Clause 6. The electronic device of clause 4, where the processing circuit is further configured to:
receive an updated location of the second IAB node, where the second IAB node provides the updated location in a period less than a channel correlation time; and
based on the updated location, transmit updated control information to the second IAB node, where the updated control information includes updated path information and/or updated adjustment information for the radio RX/TX status.

Clause 7. The electronic device of clause 6, where the processing circuit is further configured to:

based on a speed vector of the second IAB node and the first power-limited area, determine timing for updating control of the second IAB node.

Clause 8. The electronic device of clause 5, where the processing circuit is further configured to:

upon adjusting of the radio RX/TX status of the second IAB node, calculate a second power-limited area of the first IAB node for the second IAB node, where the second power-limited area defines a three-dimensional space surrounding the first IAB node, and the second IAB node will cause harmful interference to the first IAB node when entering the second power-limited area with its adjusted radio RX/TX status.

Clause 9. The electronic device of clause 4, where the processing circuit is further configured to:

calculate a third power-limited area of a third IAB node for the second IAB node, and take a union of the first power-limited area and the third power-limited area to form a joint power-limited area of the two, where the third power-limited area defines a three-dimensional space surrounding the third IAB node, and the second IAB node will cause harmful interference to the third IAB node when entering the third power-limited area with its radio RX/TX status, where the path information instructs the second IAB node to avoid entering the joint power-limited area, and/or where the adjustment information for the radio RX/TX status instructs the second IAB node to adjust the beam direction or to reduce the transmit power when entering the joint power-limited area.

Clause 10. The electronic device of clause 1, where the processing circuit is further configured to:

receive a system access request message from the second IAB node; and send a system access response message to the second IAB node, where the response message includes the control information for the second IAB node.

Clause 11. The electronic device of clause 1, where the processing circuit is further configured to:

receive an access request from a first user equipment, where the access request includes one or more of a location, a service demand time, and a service type of the first user equipment; and based on the access request, send an access response to the first user equipment and at least one of the IAB donor and multiple IAB nodes, so as to instruct the first user equipment to access the at least one of the IAB donor and the multiple IAB nodes.

Clause 12. The electronic device of clause 11, where the processing circuit is further configured to:

based on a distance between the first user equipment and the IAB donor being less than a first threshold, preferentially determine that the first user equipment accesses the IAB donor;

based on the location of the first user equipment, preferentially determine that the first user equipment accesses a closest static IAB node in the multiple IAB nodes; or based on the service type of the first user equipment, preferentially determine that the first user equipment accesses a static IAB node capable of providing optimal throughput in the multiple IAB nodes.

Clause 13. The electronic device of clause 12, where the processing circuit is further configured to:

if the IAB donor and the static IAB node are not available, determine that the first user equipment accesses a dynamic IAB node closest or capable of providing optimal throughput in the multiple IAB nodes.

Clause 14. The electronic device of clause 11, where the processing circuit is further configured to:

determine that the second IAB node is a dynamic IAB node;

based on a first power-limited area, adjust the second IAB node to cover the first user equipment; and determine that the first user equipment accesses the second IAB node, where the adjusting includes at least one of moving the second IAB node based on the first power-limited area, adjusting a beam direction of the second IAB node, or increasing a transmit power of the second IAB node.

Clause 15. The electronic device of clause 11, where the processing circuit is further configured to:

send an access request broadcast to one or more uncontrolled IAB nodes;

receive basic information from an uncontrolled fourth IAB node;

based on the basic information, calculate a fourth power-limited area of the first IAB node for the fourth IAB node, where the fourth power-limited area defines a three-dimensional space surrounding the first IAB node, and the fourth IAB node will cause harmful interference to the first IAB node when entering the fourth power-limited area with its radio RX/TX status; and send control information to the fourth IAB node, where the control information includes at least one of the following:

path information, for instructing the fourth IAB node to avoid approaching the first IAB node; or adjustment information for the radio RX/TX status, for instructing of adjusting beam direction of the fourth IAB node or reducing transmit power of the fourth IAB node.

Clause 16. The electronic device of clause 1, where the electronic device is implemented as part of the IAB donor or a spectrum management device; or the electronic device is implemented distinctly from the IAB donor or the spectrum management device.

Clause 17. An electronic device for a second IAB node in an integrated access and backhaul (IAB) communication system, where the IAB communication system includes an IAB donor and at least a first IAB node and the second IAB node, operating frequency bands of the IAB donor and the IAB nodes at least partially overlap, and the electronic device includes a processing circuit, the processing circuit being configured to:

send basic information of the second IAB node to a spectrum management device, where the basic information includes a location and radio RX/TX status of the second IAB node, and the radio RX/TX status includes one or more of antenna array configuration, beam configuration, transmit power, and current reception performance of the second IAB node; and receive control information from the spectrum management device, where the control information includes at least one of the following:

path information, for instructing the second IAB node to avoid approaching the first IAB node; or adjustment information for the radio RX/TX status, for instructing of adjusting beam direction of the second IAB node or reducing transmit power of the second IAB node.

Clause 18. The electronic device of clause 17, where the processing circuit is further configured to:

receive a user access response from the spectrum management device, where the user access response indicates that a first user equipment is to access the second IAB node.

Clause 19. A method for an integrated access and backhaul (IAB) communication system, where the IAB communication system includes an IAB donor and at least a first IAB node and a second IAB node, operating frequency bands of the IAB donor and the IAB nodes at least partially overlap, and the method includes:

obtaining basic information of the first IAB node and the second IAB node, where the basic information includes a location and radio RX/TX status of a corresponding IAB node, and the radio RX/TX status includes one or more of antenna array configuration, beam configuration, transmit power, and current reception performance of the corresponding IAB node; and sending control information to the second IAB node, where the control information includes at least one of the following:

path information, for instructing the second IAB node to avoid approaching the first IAB node; or adjustment information for the radio RX/TX status, for instructing of adjusting beam direction of the second IAB node or reducing transmit power of the second IAB node.

Clause 20. A method for a second IAB node in an integrated access and backhaul (IAB) communication system, where the IAB communication system includes an IAB donor and at least a first IAB node and the second IAB node, operating frequency bands of the IAB donor and the IAB nodes at least partially overlap, and the method includes:

sending basic information of the second IAB node to a spectrum management device, where the basic information includes a location and radio RX/TX status of the second IAB node, and the radio RX/TX status includes one or more of antenna array configuration, beam configuration, transmit power, and current reception performance of the second IAB node; and receiving control information from the spectrum management device, where control information includes at least one of the following:

path information, for instructing the second IAB node to avoid approaching the first IAB node; or adjustment information for the radio RX/TX status, for instructing of adjusting beam direction of the second IAB node or reducing transmit power of the second IAB node.

Clause 21. A computer-readable storage medium storing thereon executable instructions which, when executed by one or more processors, implement operations of the method according to any one of claims 19 and 20.

Clause 22. A computer program product, wherein the computer program product comprises instructions which, when executed by a computer, cause the computer to perform the method according to any one of claims 19 and 20.

The exemplary embodiments of the present disclosure have been described above with reference to the drawings, but the present disclosure is of course not limited to the above examples. Those skilled in the art can obtain various changes and modifications within the scope of the appended claims, and it should be understood that these changes and modifications will naturally fall within the technical scope of the present disclosure.

For example, multiple functions included in one unit in the above embodiments may be implemented by separate devices. Alternatively, the multiple functions implemented by the multiple units in the above embodiments may be implemented by separate devices, respectively. In addition, one of the above functions can be realized by multiple units. Needless to say, such a configuration is included in the technical scope of the present disclosure.

In this specification, the steps described in the flowchart include not only processes performed in time series in the described order, but also processes performed in parallel or individually rather than necessarily in time series. In addition, even in the steps processed in time series, needless to say, the order can be changed appropriately.

Although the present disclosure and its advantages have been described in detail, it should be understood that various modifications, replacements, and changes can be made without departing from the spirit and scope of the present disclosure as defined by the appended claims. Moreover, the terms "include", "comprise", or their any other variant in the embodiments of the present disclosure is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The invention claimed is:

1. An electronic device for an integrated access and backhaul (IAB) communication system, wherein the IAB communication system comprises an IAB donor and at least a first IAB node and a second IAB node, operating frequency bands of the IAB donor and the IAB nodes at least partially overlap, and wherein the electronic device comprises a processing circuit, the processing circuit being configured to:

obtain first information of the first IAB node and the second IAB node, wherein the first information comprises a location and radio receive (RX)/transmit (TX) status of a corresponding IAB node, and the radio RX/TX status comprises one or more of an antenna array configuration, a beam configuration, a transmit power, or a current reception performance of the corresponding IAB node; and send control information to the second IAB node, wherein the control information comprises at least one of the following:

path information, for instructing the second IAB node to avoid approaching the first IAB node: or adjustment information for the radio RX/TX status, for instructing of adjusting beam direction of the second IAB node or reducing transmit power of the second IAB node, wherein the processing circuit is further configured to calculate, based on the first information, a first power-limited area of the first IAB node for the second IAB node, wherein the first power-limited area defines a three-dimensional space surrounding the first IAB node, and the second IAB node will cause interference to the first IAB node when entering the first power-limited area with its radio RX/TX status, wherein the second IAB node is instructed according to at least one of:

the path information instructs the second IAB node to avoid entering the first power-limited area, or the adjustment information for the radio RX/TX status instructs the second IAB node to adjust the beam direction or reduce the transmit power when entering the first power-limited area.

2. The electronic device according to claim 1, wherein one or more of the following exist:

the first IAB node and the second IAB node are controlled IAB nodes;

the first IAB node is a controlled IAB node, and the second IAB node is an uncontrolled IAB node;

the first IAB node and the second IAB node are static IAB nodes;

the first IAB node and the second IAB node are dynamic IAB nodes; or one of the first IAB node and the second IAB node is a static IAB node, and the other is a dynamic IAB node.

3. The electronic device according to claim 2, wherein one or more of the following exist:

the controlled IAB node comprises a macro IAB node, and the uncontrolled IAB node comprises a Pico IAB node; or at least one of the static IAB node or the dynamic IAB node is implemented by an unmanned aerial vehicle.

4. The electronic device according to claim 1, wherein calculating a first power-limited area of the first IAB node for the second IAB node comprises:

determining a threshold for reception performance of the first IAB node based on interference protection requirements and system parameters;

determining a maximum receive interference power value bearable for the first IAB node, based on the threshold for the reception performance and current reception performance of the first IAB node;

determining a maximum transmit interference power value at a specific point in a three-dimensional space, based on the maximum receive interference power value and the radio RX/TX statuses of the first IAB node and the second IAB node; and determining a specific point at which the maximum transmit interference power value is equal to the transmit power of the second IAB node as a boundary of the first power-limited area of the first IAB node for the second IAB node.

5. The electronic device according to claim 1, wherein the processing circuit is further configured to:

receive an updated location of the second IAB node, wherein the second IAB node provides the updated location in a period less than a channel correlation time; and based on the updated location, transmit updated control information to the second IAB node, wherein the updated control information comprises at least one of updated path information or updated adjustment information for the radio RX/TX status.

6. The electronic device according to claim 5, wherein the processing circuit is further configured to:

based on a speed vector of the second IAB node and the first power-limited area, determine timing for updating control of the second IAB node.

7. The electronic device according to claim 4, wherein the processing circuit is further configured to:

upon adjustment of the radio RX/TX status of the second IAB node, calculate a second power-limited area of the first IAB node for the second IAB node, wherein the second power-limited area defines a three-dimensional space surrounding the first IAB node, and the second IAB node will cause interference to the first IAB node when entering the second power-limited area with its adjusted radio RX/TX status.

8. The electronic device according to claim 1, wherein the processing circuit is further configured to:

calculate a third power-limited area of a third IAB node for the second IAB node, and take a union of the first power-limited area and the third power-limited area to form a joint power-limited area of the two, wherein the third power-limited area defines a three-dimensional space surrounding the third IAB node, and the second IAB node will cause interference to the third IAB node when entering the third power-limited area with its radio RX/TX status, wherein the second IAB node is instructed according to at least one of:

the path information instructs the second IAB node to avoid entering the joint power-limited area, or the adjustment information for the radio RX/TX status instructs the second IAB node to adjust the beam direction or to reduce the transmit power when entering the joint power-limited area.

9. The electronic device according to claim 1, wherein the processing circuit is further configured to:

receive a system access request message from the second IAB node; and send a system access response message to the second IAB node, wherein the response message comprises the control information for the second IAB node.

10. The electronic device according to claim 1, wherein the processing circuit is further configured to:

receive an access request from a first user equipment, wherein the access request comprises one or more of a location, a service demand time, or a service type of the first user equipment; and based on the access request, send an access response to the first user equipment and at least one of the IAB donor or the multiple IAB nodes, so as to instruct the first user equipment to access the at least one of the IAB donor or the multiple IAB nodes.

11. The electronic device according to claim 10, wherein the processing circuit is further configured to:

based on a distance between the first user equipment and the IAB donor being less than a first threshold, preferentially determine that the first user equipment accesses the IAB donor;

based on the location of the first user equipment, preferentially determine that the first user equipment accesses a closest static IAB node in the multiple IAB nodes; or based on the service type of the first user equipment, preferentially determine that the first user equipment accesses a static IAB node capable of providing optimal throughput in the multiple IAB nodes.

12. The electronic device according to claim 11, wherein the processing circuit is further configured to:

if the IAB donor and the static IAB node are not available, determine that the first user equipment accesses a dynamic IAB node closest or capable of providing optimal throughput in the multiple IAB nodes.

13. The electronic device according to claim 10, wherein the processing circuit is further configured to:

determine that the second IAB node is a dynamic IAB node;

based on a first power-limited area, adjust the second IAB node to cover the first user equipment; and determine that the first user equipment accesses the second IAB node, wherein the adjusting comprises at least one of moving the second IAB node based on the first power-limited area, adjusting a beam direction of the second IAB node, or increasing a transmit power of the second IAB node.

14. The electronic device according to claim 10, wherein the processing circuit is further configured to:

send an access request broadcast to one or more uncontrolled IAB nodes;

receive first information from an uncontrolled fourth IAB node;

based on the first information, calculate a fourth power-limited area of the first IAB node for the fourth IAB node, wherein the fourth power-limited area defines a three-dimensional space surrounding the first IAB node, and the fourth IAB node will cause interference to the first IAB node when entering the fourth power-limited area with its radio RX/TX status; and send control information to the fourth IAB node, wherein the control information comprises at least one of the following:

path information, for instructing the fourth IAB node to avoid approaching the first IAB node; or adjustment information for the radio RX/TX status, for instructing of adjusting beam direction of the fourth IAB node or reducing transmit power of the fourth IAB node.

15. The electronic device according to claim 1, wherein the electronic device is implemented as part of the IAB donor or a spectrum management device; or the electronic device is implemented distinctly from the IAB donor or the spectrum management device.

16. An electronic device for a second IAB node in an integrated access and backhaul (IAB) communication system, wherein the IAB communication system comprises an IAB donor and at least a first IAB node and the second IAB node, operating frequency bands of the IAB donor and the IAB nodes at least partially overlap, and wherein the electronic device comprises a processing circuit, the processing circuit being configured to:

send first information of the second IAB node to a spectrum management device, wherein the first information comprises a location and radio RX/TX status of the second IAB node, and the radio RX/TX status comprises one or more of an antenna array configuration, a beam configuration, a transmit power, or a current reception performance of the second IAB node; and receive control information from the spectrum management device, wherein the control information comprises at least one of the following:

path information, for instructing the second IAB node to avoid approaching the first IAB node; or adjustment information for the radio RX/TX status, for instructing of adjusting beam direction of the second IAB node or reducing transmit power of the second IAB node, wherein, based on the first information, a first power-limited area of the first IAB node for the second IAB node, a first power-limited area of the first IAB node for the second IAB node is calculated, wherein the first power-limited area defines a three-dimensional space surrounding the first IAB node, and the second IAB node will cause interference to the first IAB node when entering the first power-limited area with its radio RX/TX status, wherein the second IAB node is instructed according to at least one of:

the path information instructs the second IAB node to avoid entering the first power-limited area, or the adjustment information for the radio RX/TX status instructs the second IAB node to adjust the beam direction or reduce the transmit power when entering the first power-limited area.

17. The electronic device according to claim 16, wherein the processing circuit is further configured to:

receive a user access response from the spectrum management device, wherein the user access response indicates that a first user equipment is to access the second IAB node.

18. A method for an integrated access and backhaul (IAB) communication system, wherein the IAB communication system comprises an IAB donor and at least a first IAB node and a second IAB node, operating frequency bands of the IAB donor and the IAB nodes at least partially overlap, and the method comprises:

obtaining first information of the first IAB node and the second IAB node, wherein the first information comprises a location and radio RX/TX status of a corresponding IAB node, and the radio RX/TX status comprises one or more of an antenna array configuration, a beam configuration, a transmit power, or a current reception performance of the corresponding IAB node; and sending control information to the second IAB node, wherein the control information comprises at least one of the following:

path information, for instructing the second IAB node to avoid approaching the first IAB node; or adjustment information for the radio RX/TX status, for instructing of adjusting beam direction of the second IAB node or reducing transmit power of the second IAB node, wherein the method further comprises calculating, based on the first information, a first power-limited area of the first IAB node for the second IAB node, wherein the first power-limited area defines a three-dimensional space surrounding the first IAB node, and the second IAB node will cause interference to the first IAB node when entering the first power-limited area with its radio RX/TX status, wherein the second IAB node is instructed according to at least one of:

the path information instructs the second IAB node to avoid entering the first power-limited area, or the adjustment information for the radio RX/TX status instructs the second IAB node to adjust the beam direction or reduce the transmit power when entering the first power-limited area.

19. A method for a second IAB node in an integrated access and backhaul (IAB) communication system, wherein the IAB communication system comprises an IAB donor and at least a first IAB node and the second IAB node, operating frequency bands of the IAB donor and the IAB nodes at least partially overlap, and the method comprises:

sending first information of the second IAB node to a spectrum management device, wherein the first information comprises a location and radio RX/TX status of the second IAB node, and the radio RX/TX status comprises one or more of an antenna array configuration, a beam configuration, a transmit power, or a current reception performance of the second IAB node; and receiving control information from the spectrum management device, wherein the control information comprises at least one of the following:

path information, for instructing the second IAB node to avoid approaching the first IAB node; or adjustment information for the radio RX/TX status, for instructing of adjusting beam direction of the second IAB node or reducing transmit power of the second IAB node, wherein, based on the first information, a first power-limited area of the first IAB node for the second IAB node, a first power-limited area of the first IAB node for the second IAB node is calculated, wherein the first power-limited area defines a three-dimensional space surrounding the first IAB node, and the second IAB node will cause interference to the first IAB node when entering the first power-limited area with its radio RX/TX status, wherein the second IAB node is instructed according to at least one of:

the path information instructs the second IAB node to avoid entering the first power-limited area, or the adjustment information for the radio RX/TX status instructs the second IAB node to adjust the beam direction or reduce the transmit power when entering the first power-limited area.

* * * * *